United States Patent
Yushin et al.

(10) Patent No.: US 11,214,918 B2
(45) Date of Patent: Jan. 4, 2022

(54) NANOWIRE STRUCTURES AND METHODS OF MANUFACTURE THEREOF

(71) Applicant: Sila Nanotechnologies, Inc., Alameda, CA (US)

(72) Inventors: Gleb Yushin, Atlanta, GA (US); Kostiantyn Turcheniuk, Atlanta, GA (US); Fujia Wang, Atlanta, GA (US)

(73) Assignees: SILA NANOTECHNOLOGIES, INC., Alameda, CA (US); GEORGIA TECH RESEARCH CORPORATION, Atlanta, GA (US)

( * ) Notice: Subject to any disclaimer, the term of this patent is extended or adjusted under 35 U.S.C. 154(b) by 144 days.

(21) Appl. No.: 16/520,265

(22) Filed: Jul. 23, 2019

(65) Prior Publication Data

US 2020/0024796 A1    Jan. 23, 2020

Related U.S. Application Data

(60) Provisional application No. 62/702,234, filed on Jul. 23, 2018.

(51) Int. Cl.
*D06M 11/34* (2006.01)
*H01M 10/0525* (2010.01)
*H01M 50/44* (2021.01)
*H01M 50/403* (2021.01)
*H01M 50/411* (2021.01)

(52) U.S. Cl.
CPC ........ *D06M 11/34* (2013.01); *H01M 10/0525* (2013.01); *H01M 50/403* (2021.01); *H01M 50/411* (2021.01); *H01M 50/44* (2021.01)

(58) Field of Classification Search
CPC ............. D06M 11/34; H01M 10/0525; H01M 50/403; H01M 50/44; H01M 50/411
See application file for complete search history.

(56) References Cited

U.S. PATENT DOCUMENTS

2016/0248118 A1*  8/2016  Chan .................. H01M 10/058

* cited by examiner

*Primary Examiner* — Edward J Cain
(74) *Attorney, Agent, or Firm* — Muncy, Geissler, Olds & Lowe, P.C.; Daniel Podhajny

(57) ABSTRACT

In an embodiment, metal-organic nanowires or nanofibers comprising polymer chains with around 100 or more repeat units are synthesized. The metal-organic nanowires or nanofibers are exposed to a reactive gas at a temperature in excess of around 100° C. and at a pressure in the range from around 0.001 to around 100 atmospheres.

18 Claims, 22 Drawing Sheets
(3 of 22 Drawing Sheet(s) Filed in Color)

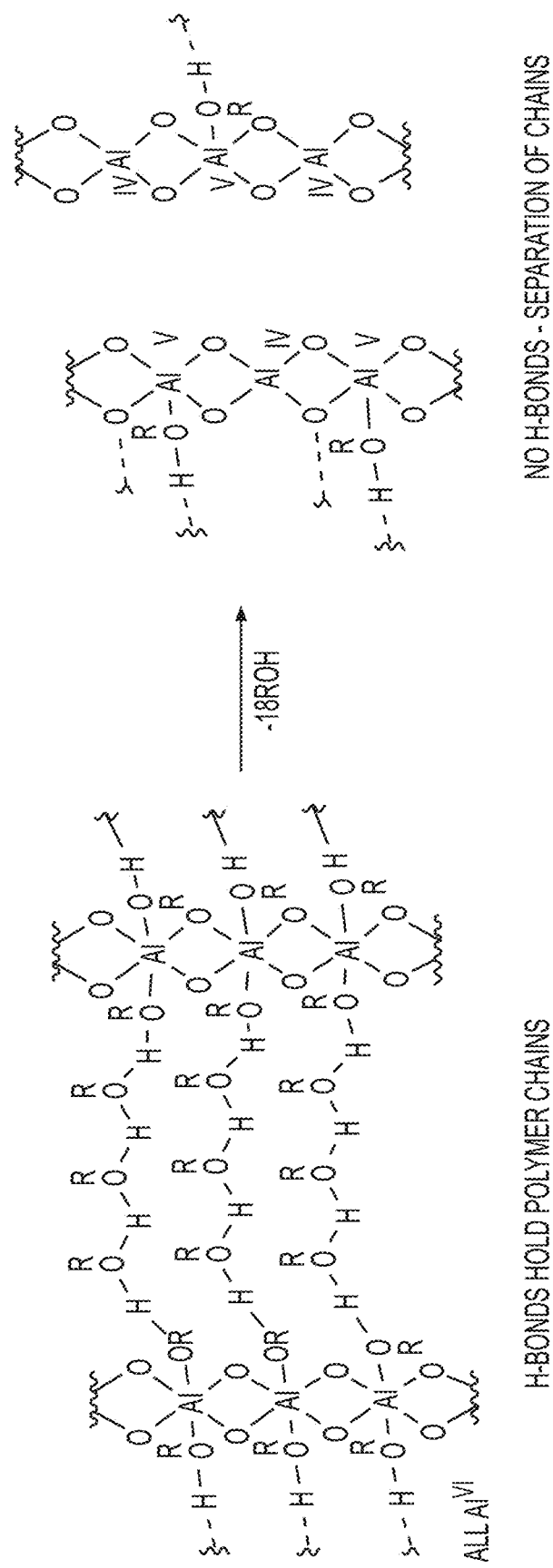

```
1600                    1700
  ▼                       │
┌─────────────────────────────────────────────┐
│ SYNTHESIZING METAL-ORGANIC NANOWIRES OR     │
│ NANOFIBERS BY IMMERSING A BIMETALLIC ALLOY  │
│ IN AT LEAST ONE SOLVENT                     │
└─────────────────────────────────────────────┘
                       ▼
```

FIG. 17

```
1700                    1800
  ▼                       │
┌─────────────────────────────────────────────┐
│ IMMERSE THE BIMETALLIC ALLOW IN A FIRST     │
│ SOLVENT AT A FIRST TEMPERATURE TO PRODUCE   │
│ A SET OF METAL-ORGANIC NANOWIRE BUNDLES     │
└─────────────────────────────────────────────┘
                              1802
                                │
┌─────────────────────────────────────────────┐
│ IMMERSE THE SET OF METAL-ORGANIC NANOWIRE   │
│ BUNDLES IN A SECOND SOLVENT AT A SECOND     │
│ TEMPERATURE TO SEPARATE INDIVIDUAL METAL-   │
│ ORGANIC NANOWIRES FROM THE SET OF METAL-    │
│ ORGANIC NANOWIRE BUNDLES                    │
└─────────────────────────────────────────────┘
                       ▼
```

FIG. 18

NANOWIRE STRUCTURES AND METHODS OF MANUFACTURE THEREOF

CLAIM OF PRIORITY UNDER 35 U.S.C. § 119

The present application for patent claims the benefit of U.S. Provisional Application No. 62/702,234, entitled "NANOWIRE STRUCTURES AND METHODS OF MANUFACTURE THEREOF," filed Jul. 23, 2018, which is expressly incorporated herein by reference in its entirety.

BACKGROUND

Field

The present disclosure relates generally to a nanowire structures and methods of manufacturing nanowire structures.

Background

One dimensional (1D) ceramic nanowires (NWs) exhibit ultra-high stiffness and strength. When used as a reinforcement filler, 1D ceramic NWs can significantly improve the load-bearing characteristics of epoxy, metal, glass, and polymer composites. However, most conventional synthesis methods of ceramic NWs have proved to be difficult and not appropriate for low-cost industrial scale production. The high price of ceramic NWs is related to the use of expensive synthesis tools and precursors, corrosive and dangerous chemicals, and small throughput (mass of NWs produced in the reactors per unit reactor volume per unit time) using conventional techniques, such as various template-assisted approaches, chemical vapor deposition, and electrospinning.

Accordingly, there remains a need for improved manufacturing of NWs and/or nanofibers.

SUMMARY

In an embodiment, metal-organic nanowires or nanofibers comprising polymer chains with around 100 or more repeat units are synthesized. The metal-organic nanowires or nanofibers are exposed to a reactive gas at a temperature in excess of around 100° C. and at a pressure in the range from around 0.001 to around 100 atmospheres.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

(FIG. 1A) XRD; (FIGS. 1B-D) selected TEM micrographs of the Al—Li16, Al—Li-9, and Al—Li4 samples, respectively.

(FIGS. 2A-2C) SEM image of grains of Al—Li16, Al—Li9, and Al—Li4 alloy; (FIGS. 2D-2F) SEM image of cross section of Al—Li16, Al—Li9, and Al—Li4 alloy and (FIGS. 2G-2I) EDS Al mapping of the regions shown above. Lighter parts of FIGS. 2G-2I correspond to Al.

FIGS. 3A-3B illustrate low and high magnification SEM images, respectively, of grains of Al—Li16 alloy treated with ethanol for 10-20 min; FIGS. 3B and 3D illustrate corresponding EDS Al, O and C mappings of the regions shown beside in FIGS. 3A and 3C, respectively.

FIGS. 5A-5D illustrate Al MAS NMR of the NWs bundles (FIG. 5A) and separated NWs (FIG. 5B). The proposed chemical structures of the NWs bundles (FIG. 5C) and separated NWs (FIG. 5D), according to the NMR and TGA observations. The degradation pathways of six-coordinated Al atoms with tightly packed ethoxide groups leads to the less hindered four- and five-coordinated Al atoms.

FIG. 17 illustrates an example implementation of part of the process of FIG. 16 in accordance with an embodiment of the disclosure.

FIG. 18 illustrates an example implementation of the process of FIG. 17 in accordance with an embodiment of the disclosure.

DETAILED DESCRIPTION

Figure 1A:
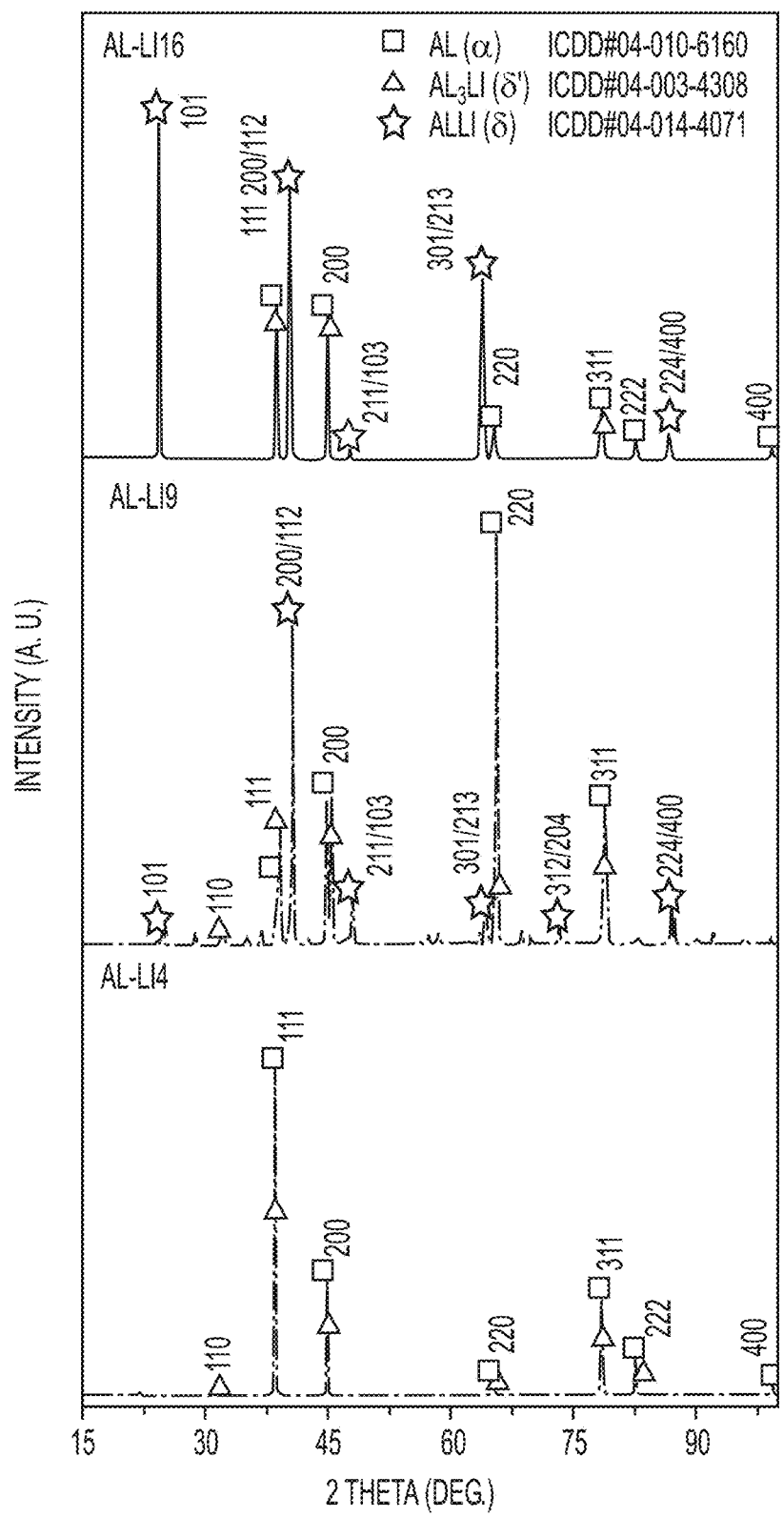
FIGS. 1A-1D illustrate crystallographic characterizations of an Al—Li alloy produced with different Li content (16, 9 and 4 wt. %)

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 50 µm to 1200 µm (i.e., a level of precision in units or increments of ones) encompasses (in µm) a set of [50, 51, 52, 43, . . . , 1199, 1200], as if the intervening numbers 51 through 1199 in units or increments of ones were expressly disclosed. In another example, a numerical percentage range from 0.01% to 10.00% (i.e., a level of precision in units or increments of hundredths) encompasses (in %) a set of [0.01, 0.02, 0.03, . . . , 9.99, 10.00], as if the intervening numbers between 0.02 and 9.99 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

While the description of one or more embodiments below may describe certain examples in the context of aluminum- (Al-) or oxygen- (O-) comprising nanowires (NW) (which may also be called whiskers or nanofibers or other elongated particles and may be porous elongated particles in some embodiments), it will be appreciated that various aspects may be applicable to other compositions (such as other single metal or mixed metal oxides as well as single metal (or mixed metal(s)) oxyfluorides, single metal (or mixed metal(s)) fluorides, single metal (or mixed metal(s)) oxynitrides, single metal (or mixed metal(s)) nitrides, single metal (or mixed metal(s)) oxyhydroxides, single metal (or mixed metal(s)) sulfides or selenides, single metal (or mixed metal (s)) carbides, single metal (or mixed metal(s)) oxycarbides, single metal (or mixed metal(s)) carbonitrides, single metal (or mixed metal(s)) oxycarbonitrides, and various other ceramic elongated particles that comprise single metal or mixed metal(s) compositions). Examples of suitable metal (or semimetal) atoms for such compositions may include (but not limited to) at least one of the following (depending on the particular application) or their combination: Al, Li, Mg, Ti, Ta, Li, Sc, Cu, Fe, Na, K, Cs, Ba, Be, C, Zn, Cr, Zr, Y, La, Ce, Sn, Sb, Si, Sm, Mo, Nb, Ta, W, Ag, Au, Pt, U, to name a few. In some designs, such metals may not form carbides or other ceramic compounds, as known in state of the art.

While the description of one or more embodiments below may describe certain examples in the context of nanowires (or whiskers, nanofibers, nanoribbons or other elongated particles with aspect ratio in the range from around 5 to around 100,000,000, more commonly in the range from around 20 to around 50,000) that comprise a single metal (for example, just Al or just Mg) in their composition, it will be appreciated that various aspects may be applicable to compositions that comprise two, three or more metals. For example, Al may be used in combination with Li, Mg, Si, Cu, Zn, Zr, Ti, Ta, Cr, La (or Ln in general), Y, Sc, and many other metals to form oxide, oxyfluorides, fluorides, oxynitrides, nitrides, oxyhydroxides, sulfides, selenides and various other ceramic compositions of interest. Similarly, Mg and other metals may be used in combination with Li, Al, Si, Zn, Zr, Ti, Ta, Cr, La (or Ln in general), Y, Sc, and many other metals to form oxide, oxyfluorides, fluorides, oxynitrides, nitrides, oxyhydroxides, sulfides, selenides and various other ceramic compositions of interest.

While the description of one or more embodiments below may describe certain examples in the context of formation of metal alkoxide NWs in the form of metal ethoxide NWs, it will be appreciated that various aspects may be applicable to the formation of other types of alkoxide nanowires (e.g., various metal propoxide NWs, metal methoxide NWs, etc.).

While the description of one or more embodiments below may describe certain examples in the context of formation of metal-organic NWs in the form of metal alkoxide NWs, it will be appreciated that various aspects may be applicable to the formation of other types of metal-organic NWs.

While the description of one or more embodiments below may describe certain examples in the context of pure metal alkoxide NWs, it will be appreciated that various aspects may be applicable to compositions that may contain alkoxide and some fraction of alkoxide adjacent species, such as hydroxide, oxide, nitride, oxynitride, fluoride, oxyfluoride or many others. In some designs, the structure of pure alkoxide may contain bridging alkoxide groups (where oxygen of alkoxide is bonded to two or more metal atoms) and terminal alkoxide groups (where oxygen of alkoxide is bonded to one metal atom). Note that in the compositions that may contain both alkoxide and one or more other species (such as hydroxy-alkoxides, carboxy-alkoxide, oxy-alkoxide, nitrido-alkoxides, among many others), either the alkoxide or the other group(s) may occupy bridging or terminal positions. As such, the coordination number for metal atoms in such compositions may vary from that of the pure alkoxides and the ratio of the alkoxide groups (—RO) to metal atoms may vary from that of the pure alkoxides. For example, in case of aluminum ethoxide compositions, the aluminum (Al) atoms may not be 6-coordinated (as expected for pure $Al(EtO)_3$), but may, for example, comprise 6-coordinated, 5-coordinated, 4-coordinated and 3-coordinated Al atoms. Similarly, the molar ratio of ethoxide groups (-EtO) to Al atom may not be 3 (as expected for pure $Al(EtO)_3$), but may, for example, range from as high as around 10 to as low as around 0.1. Similarly, Al ethoxide can comprise ethoxy, hydroxy, oxy and ethanol ligands, such as $Al(EtO)_{3-(x+y+z)}(OH)_x(EtOH)_y(O)_z$, where x, y and z range from as high as 3 to as low as 0.001. Similarly, ethoxy, hydroxy, oxy and ethanol ligands can occupy bridging or terminal positions.

While the description of one or more embodiments below may describe certain examples in the context of monomeric alkoxides, it will be appreciated that various aspects may be applicable to compositions that may contain oligomeric and polymeric alkoxides than may contain from about 2 to about 1,000,000,000 repeat units. Examples of such alkoxides may include aluminum ethoxide compositions such as $[Al(EtO)_{3-(x+y+z)}(OH)_x(EtOH)_y(O)_z]_n$, where x, y and z may range from as high as 3 to as low as 0.001 and n may range from about 1 to about 1,000,000,000. Similarly, monomer units in oligomers and polymers may comprise chemically different units, where ligand positions may be different. Similarly, monomer units in oligomers and polymers may comprise 6-coordinated, 5-coordinated, 4-coordinated and 3-coordinated Al atoms. Similarly, oligomeric and polymeric alkoxides may each exhibit a different tacticity, molecular weight and/or polydispersity index.

While the description of one or more embodiments below may describe certain examples in the context of converting metal-organic (e.g., alkoxide, such as ethoxide, n-propoxide, iso-propoxide and others) NWs to oxide NWs by heating in air (or, more generally, oxygen-containing gas or water vapor-containing gas or in some designs, inert gas), it will be appreciated that various aspects may be applicable to the formation of ceramic NWs by treatment of the metal-organic NWs in other controlled environments (e.g., in ammonia solution or gas comprising ammonia vapors or nitrogen plasma for the formation of nitrides or oxynitrides or, more generally, nitrogen-doped or nitrogen-containing ceramics; methane, ethylene, acetylene, propylene or other hydrocarbon-containing gases or their mixtures for the formation of carbides or oxycarbides or carbo-nitrides or carbon-doped or more generally carbon-containing ceramics; gases comprising sulfur vapors or hydrogen sulfide or more generally sulfur-containing gases/plasma for the formation of sulfides or oxysulfides or sulfur-doped or, more generally, sulfur-containing ceramics, gases comprising fluorine atoms or fluorine ions for the formation of fluorides or oxyfluorides or fluorinitrides or oxyfluoronitrides or more generally fluorine containing ceramics; etc.).

While the description of one or more embodiments below may describe certain examples in the context of converting metal-organic (e.g., alkoxide, such as ethoxide and others) NWs to ceramic (e.g., oxide) NWs by heating at atmospheric pressure, it will be appreciated that such heat-treatments could be conducted in vacuum (sub-atmospheric pressure) or above atmospheric pressure in some designs.

While the description of one or more embodiments below may describe certain examples in the context of converting metal-organic (e.g., alkoxide, such as ethoxide or propoxide and others) NWs to ceramic (e.g., oxide) NWs in a single stage (heating/cooling at the same pressure in the same environment/composition), in some designs it may be advantageous to utilize multiple stages, where each stage differs from others in terms of environment (e.g., oxygen or moisture content or different composition of other reactive gas species), pressure, temperature, phase and/or other factors.

While the description of one or more embodiments below may describe certain examples in the context of converting metal-organic (e.g., alkoxide, such as ethoxide or propoxide and others) NWs to ceramic (e.g., oxide) NWs by heating in a gaseous environment, it will be appreciated that at least one step in such a conversion process may be conducted in a liquid phase.

While the description of one or more embodiments below may describe certain examples in the context of converting metal-organic (e.g., alkoxide, such as ethoxide or propoxide and others) NWs to ceramic (e.g., oxide) NWs in an environment comprising a non-ionized gas, it will be appreciated that at least one stage in such a conversion process may be conducted in an environment comprising an ionized gas (e.g., treatment in plasma).

While the description of one or more embodiments below may describe certain examples of alcohol reagents (e.g., ethanol, methanol, iso-propanol, n-propanol, tert-butanol, and others) to convert bulk alloys to metal-organic NWs, it will be appreciated that various aspects may be applicable to alcohols of the general formula ROH in which R can be hydrogen, $NH_2$, OH, alkyl, $C_nH_{2n+1}$, hydroxyalkyl, aminoalkyl, carboxyalkyl, cycloalkyl, alkenyl, alkynyl, aryl, phenyl ($C_6H_5$), naphtyl, heteroaryl, alkylphenyl, cyclohexyl, $RC_6H_4$— (where R is $C_nH_{2n+1}$, hydroxyalkyl, aminoalkyl, carboxyalkyl, aryl, phenyl ($C_6H_5$), naphtyl, heteroaryl, alkylphenyl, OH, $NH_2$, $SO_3H$), polycyclic aryl, among others.

While the description of one or more embodiments below may describe certain examples of alcohol reagents of a general formula ROH to convert bulk alloys to metal-organic NWs, it will be appreciated that various aspects may be applicable to other reagents of a general formula $RNH_2$ in which R can be hydrogen, $NH_2$, OH, alkyl, $C_nH_{2n+1}$, hydroxyalkyl, aminoalkyl, carboxyalkyl, cycloalkyl, alkenyl, alkynyl, aryl, phenyl ($C_6H_5$), naphtyl, heteroaryl, alkylphenyl, cyclohexyl, $RC_6H_4$— (where R is $C_nH_{2n+1}$, hydroxyalkyl, aminoalkyl, carboxyalkyl, aryl, phenyl ($C_6H_5$), naphtyl, heteroaryl, alkylphenyl, OH, $NH_2$, $SO_3H$), polycyclic aryl, among others. In other designs, it will be appreciated if $RNH_2$ reagents may be used in solutions of water, alcohols or aqueous solutions of bases.

While the description of one or more embodiments below may describe certain examples of alcohol reagents (e.g., ethanol, methanol, iso-propanol, n-propanol or others) to convert bulk alloys to metal-organic NWs, it will be appreciated that various aspects may be applicable to solutions comprising acids, bases or metal salts in alcohols.

Many of the examples provided below in this disclosure focus on the formation of aluminum (Al) ethoxide NWs as exemplary illustrations of metal alkoxide (or, more generally, metal-organic) NW formation, but it will be appreciated that embodiments of the present disclosure are not limited to Al ethoxide NWs.

An embodiment is directed to directly converting certain bulk bimetallic alloys to metal-organic NWs at ambient temperature and pressure. By immersing, e.g., bulk AlLi (e.g., 1:1 in atomic fraction) alloy in one or more suitable anhydrous alcohols (ethanol, iso-propanol, n-propanol, or tert-butanol) at near room temperatures, 5-100 μm long Al alkoxide nanowires (NWs) may be produced, which may be converted into ceramic (e.g., oxide) NWs by heating in suitable environment (e.g., in air). In some designs, this transformation of alkoxide to ceramic oxide NWs is based on the fact that most metal-organic compounds (including alkoxides) feature strong bonds between metal and organic ligands (e.g. O, OH, OR, $NR_2$, etc.) and can be used as precursors for synthesis of various ceramic materials with controlled shape and dimensions. This is because of the covalent bonding maintained in various substitution, oxidation, or hydrolysis reaction pathways accompanying metal-organic to ceramic transformations. For certain applications, the simplicity of above-noted procedure and the flexibility to control the NW dimensions by the synthesis conditions and size of AlLi alloy grains are more advantageous than other reported procedures of NWs synthesis. The demonstrated ability to fabricate thermally stable all-ceramic flexible nonwoven/paper separators or membranes based on produced $Al_2O_3$ NWs and their outstanding performance in battery applications as well as other applications (e.g., gas or liquid purification or separation) highlight great potential for the new processing method for NWs.

However, some aspects of the fundamental understanding of metal-organic NW formation and growth mechanism was lacking in the prior art. The inventors thereby conducted a study to understand the key physical and chemical mechanisms that govern the formation and growth of aluminum alkoxide NWs. In particular, solid-state nuclear magnetic resonance (NMR) spectroscopy revealed the evolution of molecular structures in the intermediate and final reaction products. These NMR results highlight the pivotal role of the formation of strong intermolecular bonds between Al (or, more generally, metal) atoms and oxygen-bearing ligands (such as O, OH, and OR, where, R in some design can be alkyl, amino, aryl, hydroxyalkyl, heteroaryl, etc.) which comprise polymeric chains. In particular, in some designs, it might be highly preferable for the intermolecular polymer bonds to comprise coordination bonds, donor-acceptor bonds, hydrogen bonds or van-der-Waals bonds. For some applications, the ability to form long polymeric chains (within metal-organic compounds produced upon reaction of the alloys with suitable organics) may be critical for efficient NW synthesis as these enable significant deformations within the NWs without causing their pulverization (e.g., during synthesis or follow-up treatments). In some designs, for example, it may be highly preferable for the polymer chains to comprise at least about 2-10, but preferably at least about 100 and even more preferably somewhere in the range of about 1000-100,000,000 or more repeat units (mers) per average polymeric chain (depending on the NW size, the arrangement of the chains within individual NWs and bonds between the chains). In addition, formation of intramolecular bonds between the individual polymeric chains may also be critically important as these greatly enhance mechanical integrity of the individual NWs. As such, in some designs, the intramolecular polymer bonds may comprise coordination bonds, donor-acceptor bonds, hydrogen bonds or van-der-Waals bonds. Additionally, in some designs, the intramolecular polymer bonds may comprise trapped molecules, such as alcohols, ethers, lithium alkoxide, aluminum alkoxide. Furthermore, in some designs, the type of inter- and intramolecular bonds (and also the degree of swelling of the NWs in the organic solvent) affects mechanical properties of the NWs in longitudinal and transverse directions and their shrinkage during conversion to ceramic NWs. At the same time, the inventors also found that such bonds may also bond individual NWs together in bundles. As such, in some designs, it may be preferable to break some of such bonds in order to separate bundles into individual NWs, while preserving other bonds in order to maintain a high aspect ratio of the NWs. Formation of individual grains and higher concentration of the reactive metal of the alloy (e.g., Li in case of Li—Al or Li—Mg alloys) in the grain boundaries may be beneficial in some designs. Faster dissolution of such grain boundaries may greatly enhance alloy-to-NW conversion rate. Furthermore, the presence of the described above polymeric chains and intermolecular bonds between the chains in the metal-organic NWs may be very important for their successful conversion to ceramic NWs. This is because shrinkage and the associated stresses accompanied such transformation may otherwise induce pulverization or other undesirable damages of the NWs.

In part, based on the new mechanistic understanding, the inventors were able to substantially reduce the Li content in the $Li_xAl_{1-x}$ alloys used for NWs synthesis, which may lead to a marked cost reduction for large-scale fabrication of certain NWs. In addition, this new understanding provided guidance for the formation of metal-organic NWs comprising other metals and organic ligands and their subsequent successful conversion to ceramic NWs of the desired dimensions and individuality. This work advances the mechanistic understanding of large-scale, low-cost conversion of bulk alloys into metal-organic NWs.

Similar to the previously described synthesis protocol, pieces of the AlLi alloys were exposed to anhydrous ethanol, which resulted in the alloy de-lithiation. The Li component of the alloy reacts with alcohols, thus forming highly soluble Li alkoxides, which dissolve from the surface of AlLi alloys. Note that in spite of Al having a low oxidation potential (−1.6V vs. SHE), the reaction of pure Al with ethanol does not proceed unless a catalyst (an activator), such as iodine, amalgam of Al, or a mercury salt, is used to prevent Al passivation. However, upon the Li dissolution from AlLi alloy particles, the unsaturated bonds in the remaining Al were found to be sufficiently reactive to induce formation of polymeric Al ethoxide, while the continuous Li dissolution and the associated volume changes and accompanying atomic rearrangement evidently prevented passivation of the Al surface. In one of the previous studies, β-AlLi (δ phase with Li content of ~50 at. % or ~20 wt. %) was used. Here, the inventors systematically analyzed the alloy phases having a lower content of Li to understand the role of Li in the NWs formation. AlLi alloys with 16, 9, 4 wt. % Li were used, which are denoted as Al—Li16, Al—Li9, and Al—Li4 alloys, respectively.

The composition of the synthesized alloys was predicted in accordance with the Al—Li phase diagram found in "Aluminum-lithium alloys: processing, properties, and applications" by Prasad, N. E., Gokhale, A. and Wanhill, R. and hereby incorporated herein by reference in its entirety, and confirmed by X-ray diffraction (XRD) analyses. The assignment of corresponding peaks, which are respectively associated with δ (β-AlLi), δ' ($Al_3Li$) and α (fcc Al-rich) phases, is shown in FIG. 1A.

Figure 1B:
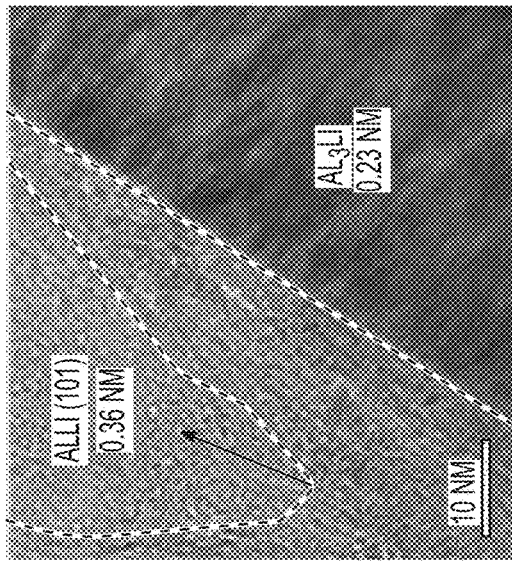
Figure 1D:
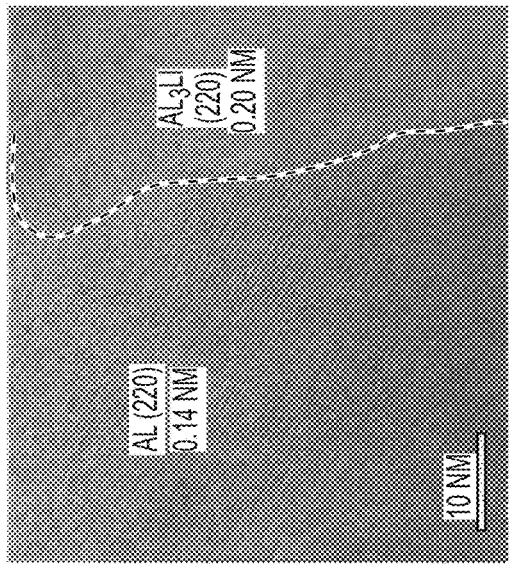
Figure 1C:
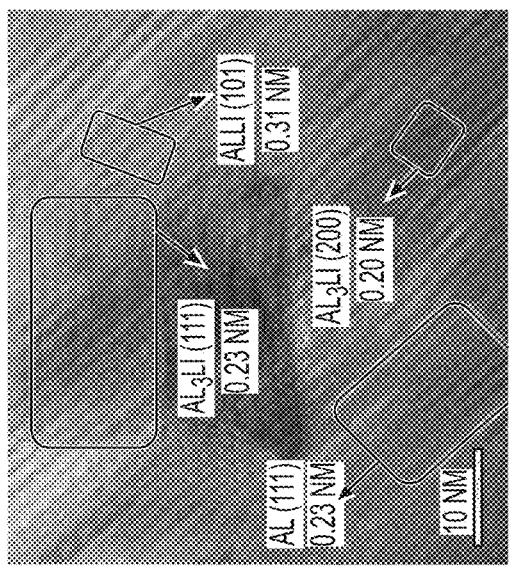
Figure 2A:
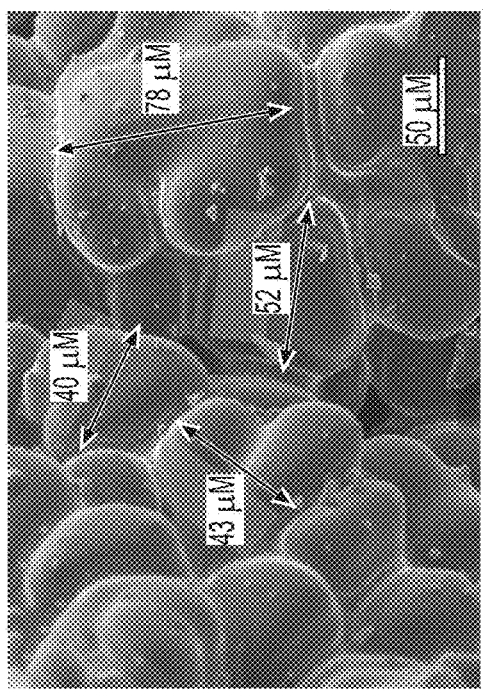
FIGS. 2A-2I illustrates morphologies of Al—Li alloy produced with different Li content.
Figure 2B:
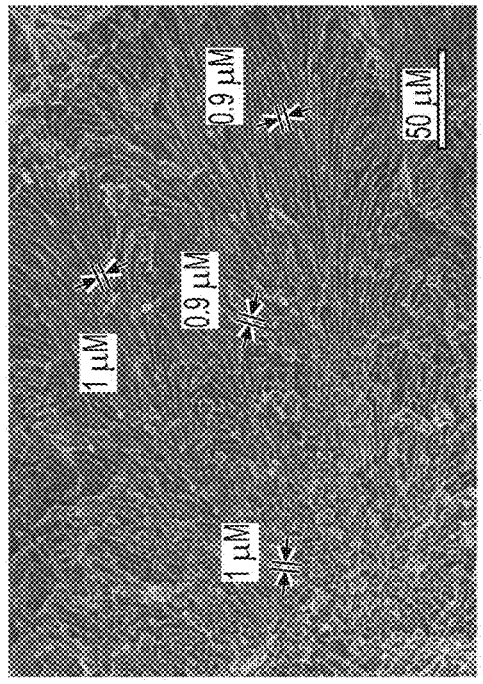
Figure 2C:
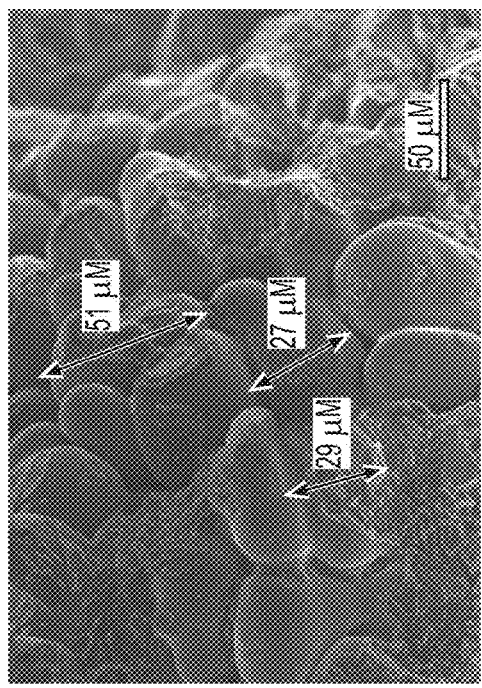
Figure 2D:
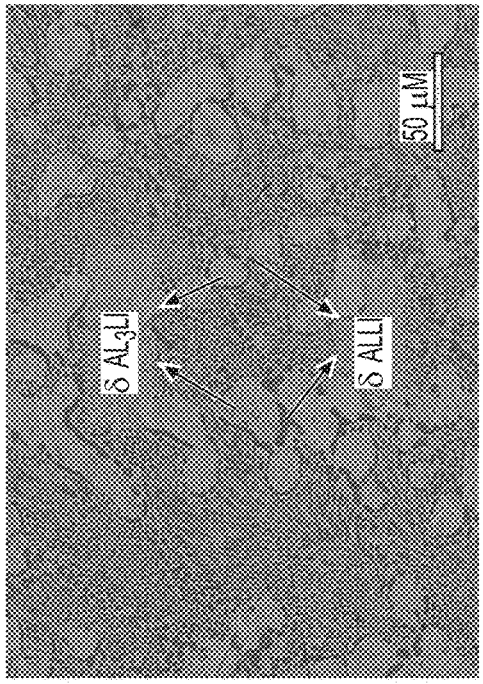
Figure 2E:
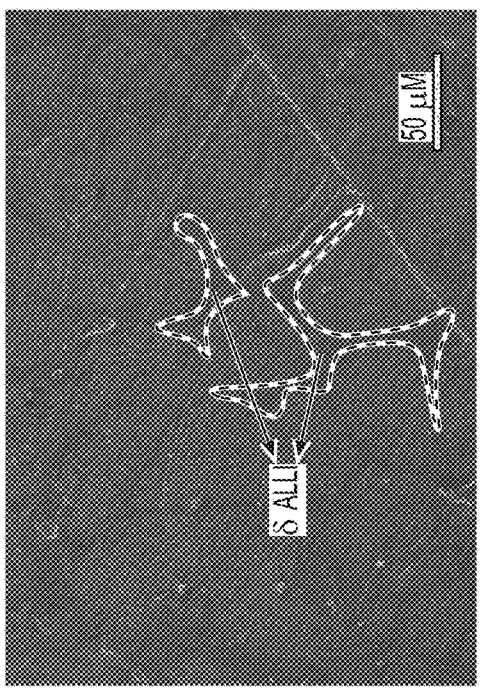
Figure 2F:
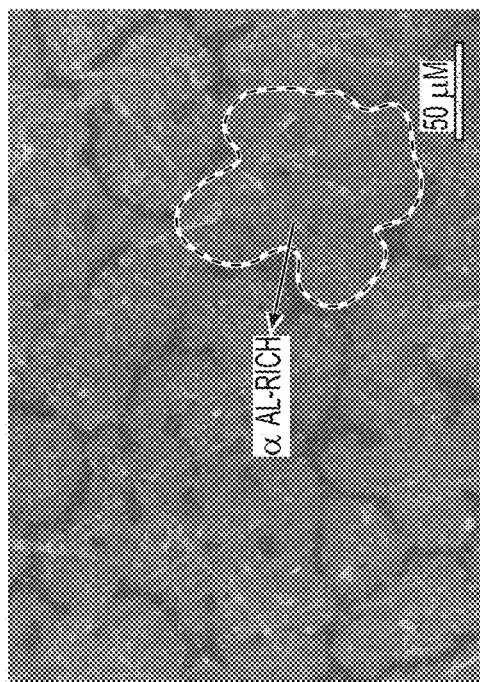
Figures 2G, 2H, 2I:
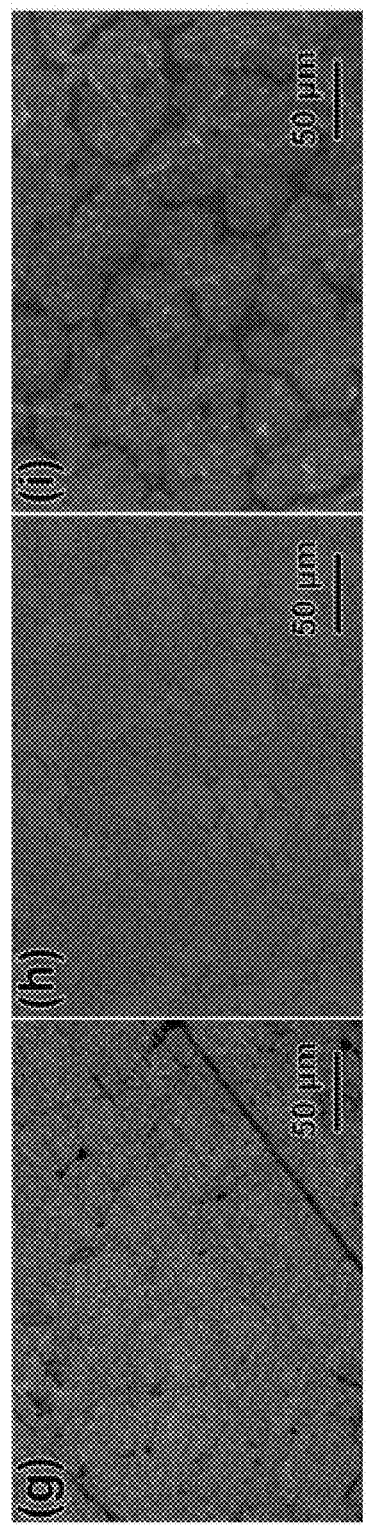

In the Al—Li16 the α and δ phases are dominant, whereas Al—Li9 can be characterized as a mixture of α, δ', and δ phases (with a small fraction of the δ'). In the Al—Li4 alloy the α phase dominates as expected due to a small Li fraction in the Al—Li4 sample. High-resolution transmission electron microscopy (TEM) studies have also revealed the crystallographic spacing expected for the presence of α, δ', and δ phases in the corresponding Al—Li16, Al—Li9, and Al—Li4 alloys (e.g., see FIGS. 1B-1D, respectively).

The alloy grain size may control the maximum length of the NWs for some applications. Here, the inventors conducted careful analysis of the grain size of each studied alloy sample.

FIGS. 2A-2I illustrates morphologies of Al—Li alloy produced with different Li content: (FIGS. 2A-2C) scanning electron microscopy (SEM) image of grains of Al—Li16, Al—Li9, and Al—Li4 alloy; (FIGS. 2D-2F) SEM image of cross section of Al—Li16, Al—Li9, and Al—Li4 alloy and (FIGS. 2G-2I) EDS Al mapping of the regions shown above. Lighter parts of FIGS. 2G-2I correspond to Al.

The SEM analyses of both the top surface (e.g., see FIGS. 2A-2C) and the polished cross-sections (e.g., see FIGS. 2D-2F) of the produced alloy samples revealed the presence of well-defined grains with grain boundaries clearly visible in all three cases. Because back-scattered electrons (which are sensitive to the atomic number of the elements, 3 for Li, 8 for O and 13 for Al) contribute to the SEM images, the darker area in the cross-sectional images correspond to Li-rich regions (e.g., $Li_2O$ formed upon surface oxidation of AlLi or other grains or δ'$Al_3Li$ vs. δ AlLi or δ'$Al_3Li$ vs. a Al-rich, depending on the sample composition). Chemical mapping of Al conducted using energy dispersive X-ray spectroscopy (EDS) provides complementary information about the Al-rich regions in the samples (compare FIGS. 2D-2F with FIGS. 2G-2I). Interestingly, both Al—Li16 and Al—Li4 alloys exhibited large (e.g., about 40-100 μm in diameter) ellipsoidal-shaped grains of presumably AlLi (darker, FIG. 2D) and α Al-rich (lighter, FIGS. 2D and 2G) compositions, respectfully.

This may result from homogeneous nucleation and growth of crystallographic grains from the melt upon cooling. At the same time, the AlLi-9 alloy showed a mixture of smaller (e.g., about 20-50 μm) ellipsoidal grains and regions of elongated (e.g., about 0.9-1 um in width and up to about 100 μm in length) grains, likely formed upon spinodal decomposition and the formation of crystalline δ'Al$_3$Li precipitates (lighter regions in FIG. 2E, darker regions in FIG. 2H) in a more disordered (as in FIG. 1C) δ AlLi alloy matrix (darker regions in FIG. 2E, lighter regions in FIG. 2H), as previously demonstrated in Al—Li alloys of similar compositions.

Exposure of all these alloy samples to ethanol at room temperature and atmospheric pressure resulted in their eventual conversion to Al ethoxide metal-organic NWs. However, a significant difference was noticed in the reaction rates, which monotonically decreased with the reduction in the Li content. While large (e.g., about 3-5 mm or higher) pieces of Al—Li16 samples completely converted to the NWs bundles in 24 h, the reaction of similarly sized Al—Li9 slows down to 6-7 days and in the case of Al—Li4 alloy to nearly 15 days at room temperature and atmospheric pressure. Note that the use of smaller pieces (e.g., produced by milling the larger alloy pieces or ribbons) would generally accelerate the reaction. Also note that at higher temperatures and/or pressures, the reaction may be accelerated substantially. In some designs, suitable temperatures may range from around −98° C. to around +160.0° C., depending on the alloy composition, freezing temperature of the solvent, condensation temperature of the solvent, reaction pressure, reaction time, composition of the organic solvents and/or other factors. Too high temperature, however, may reduce or prevent formation of the NWs or may induce damages in the NW structure (e.g., pulverization or even complete dissolution of NWs). In some designs, the utilization of low temperatures (e.g., below room temperature) may be beneficial to slow the reaction rate of reactive alloys and to enable precipitation and growth of NWs. However, too low temperature may make the process too slow or make the metal-organic NWs too brittle and prone to fracturing. In some designs, a suitable pressure may range from around 0.1 atm. to around 1,000 atm., depending on the alloy composition, reaction temperature, reaction time, composition of the organic solvents and/or other factors. Too high pressure, however, may prevent formation of the NWs or may induce damages in the NW structure (e.g., pulverization or even complete dissolution of NWs).

When the Li fraction in the alloy decreased to about 2 wt. % or below, delithiation ceased completely at room temperature and atmospheric pressure and no NWs could be detected within two weeks. According to the Al—Li phase diagram found in "Aluminum-lithium alloys: processing, properties, and applications" (2013) by Prasad, N. E., Gokhale, A. and Wanhill, R. and hereby incorporated herein by reference in its entirety, the maximum solubility of Li in α (fcc Al-rich) phase is approximately 4 wt. %. This means that upon rapid cooling of an Al—Li melt, a pure α (fcc Al-rich) solid phase likely forms with no Li-rich phases (such as δAlLi or δ'Al$_3$Li) remaining in the grain boundary regions if the amount of Li is significantly below 4 wt. %. The absence of such Li-rich phases in the grain boundary is likely responsible for the extremely low reactivity of the alloys at room temperature and atmospheric pressure. However, in some process designs (e.g., if the powder is milled to a smaller particle size), a smaller wt. % of Li may be acceptable (e.g., 2 about wt. %). In addition, for other alloys (e.g., Mg—Li alloys), a smaller wt. % of Li may also be acceptable in some designs (e.g., about 0.5-1 wt. % or more).

Figure 3A:
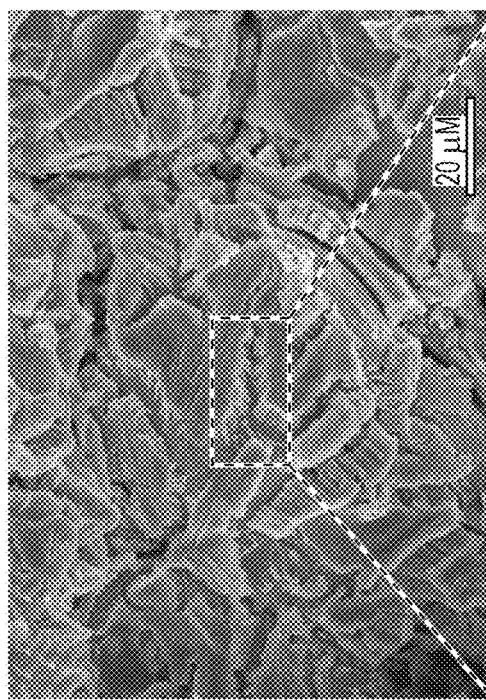
FIGS. 3A-3D illustrate the evolution of the NW growth.
Figure 3C:
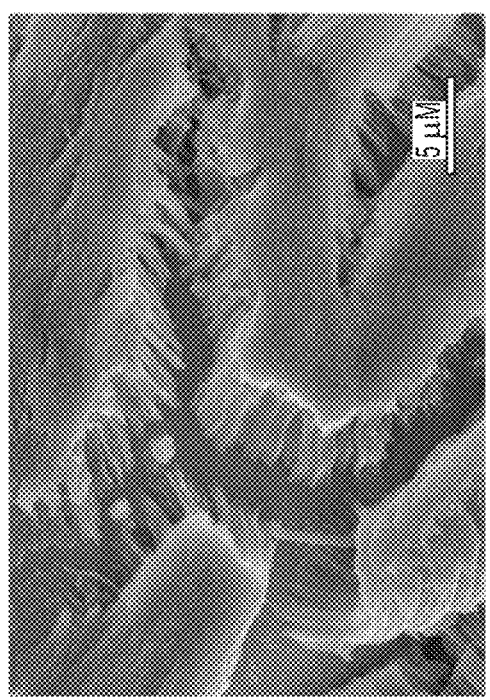
Figure 3B:
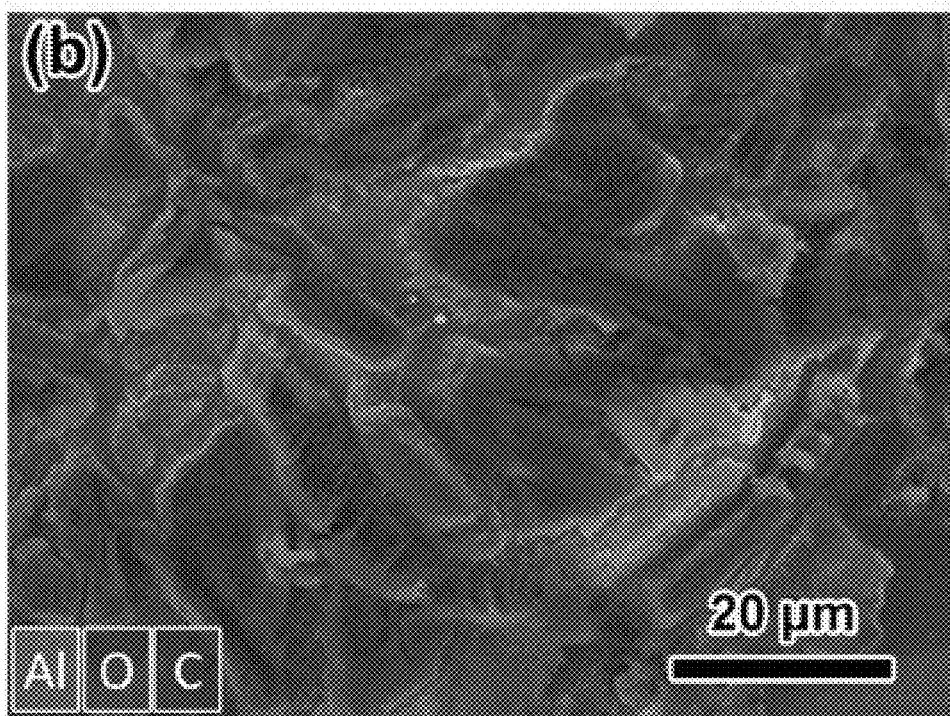
Figure 3D:
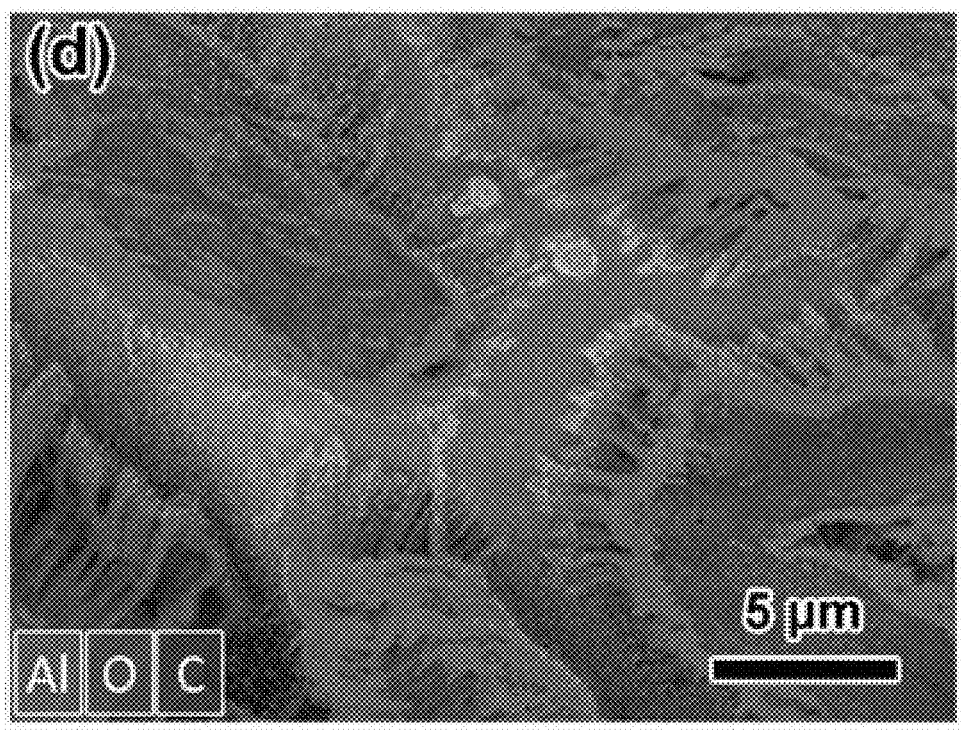
Figure 7:
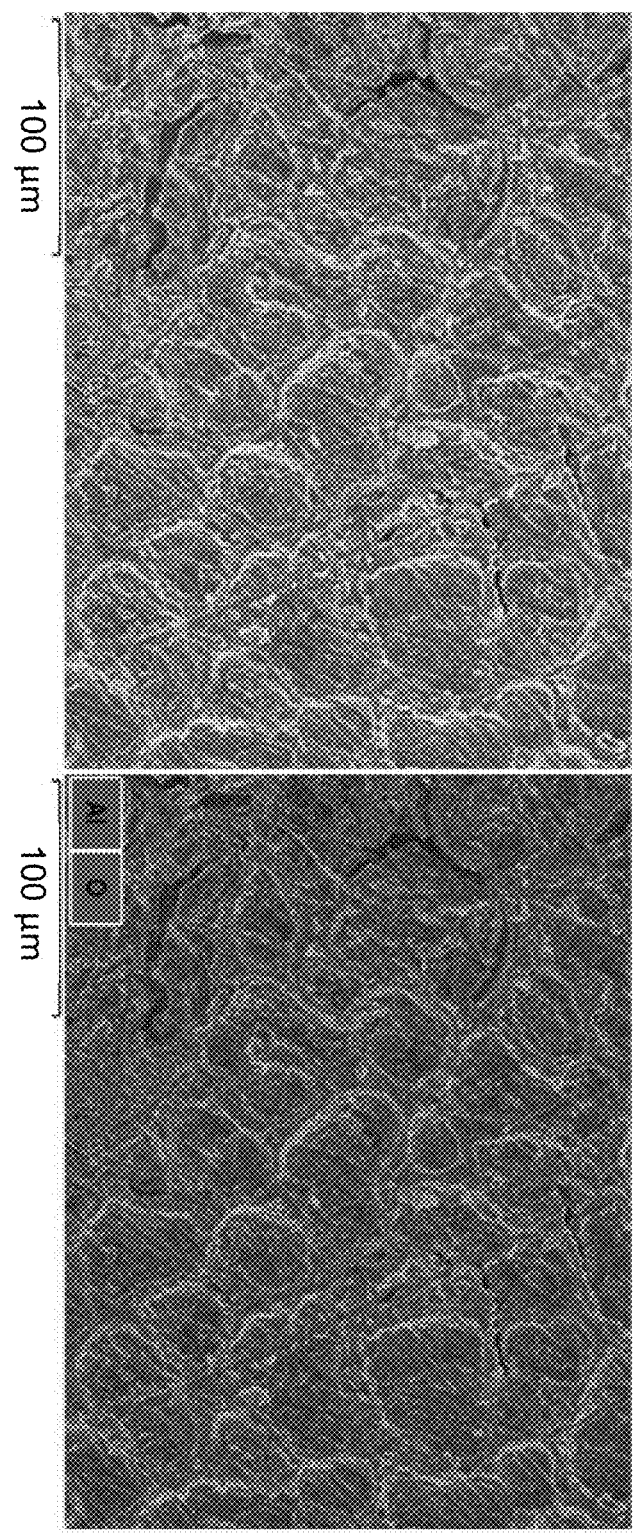
FIG. 7 illustrates an SEM image of grains of Al—Li16 alloy treated with ethanol for 1-5 min.
Figure 8A:
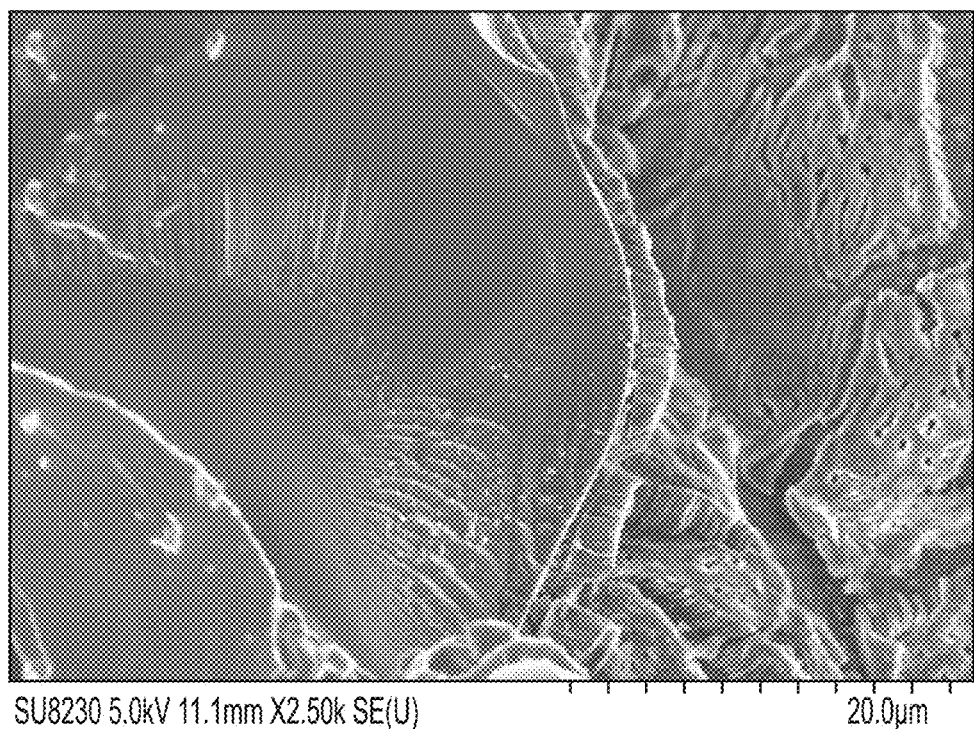
FIGS. 8A-8B illustrate SEM images of Al—Li16 alloy treated with ethanol for 10 min.
Figure 8B:
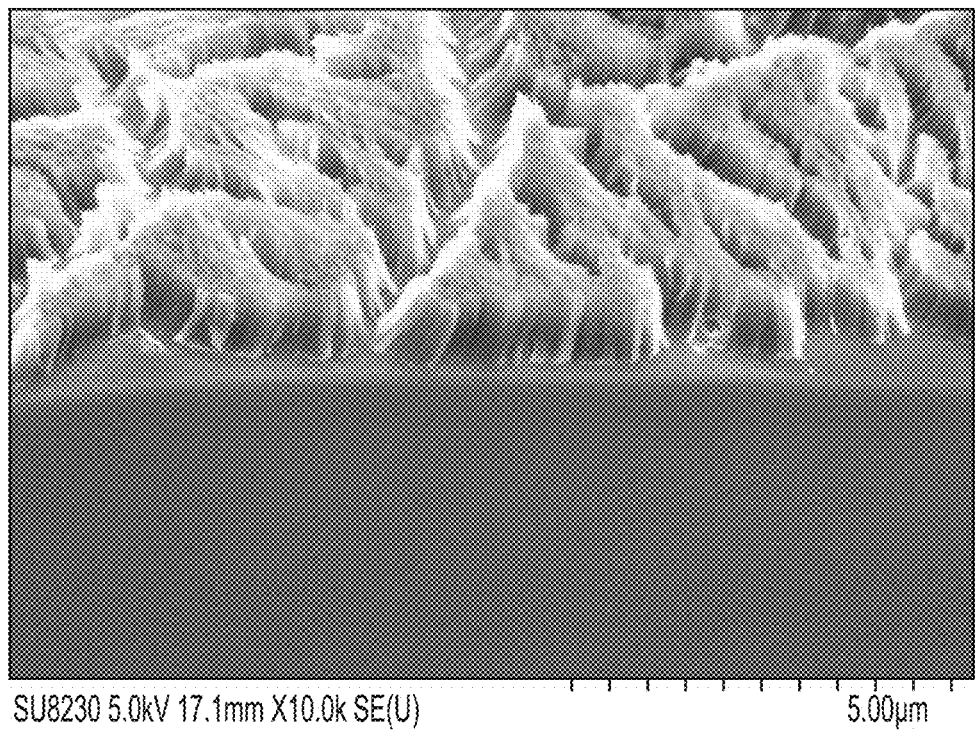

One particular exemplary and non-limiting multi-stage reaction will now be described. FIGS. 3A-3D illustrate the evolution of the NW growth. FIGS. 3A-3B illustrate low and high magnification SEM images, respectively, of grains of Al—Li16 alloy treated with ethanol for 10-20 min; FIGS. 3B and 3D illustrate corresponding EDS Al, O and C mappings of the regions shown beside in FIGS. 3A and 3C, respectively. FIG. 7 illustrates an SEM image of grains of Al—Li16 alloy treated with ethanol for 1-5 min. FIGS. 8A-8B illustrate SEM images of Al—Li16 alloy treated with ethanol for 10 min.

Figure 9:
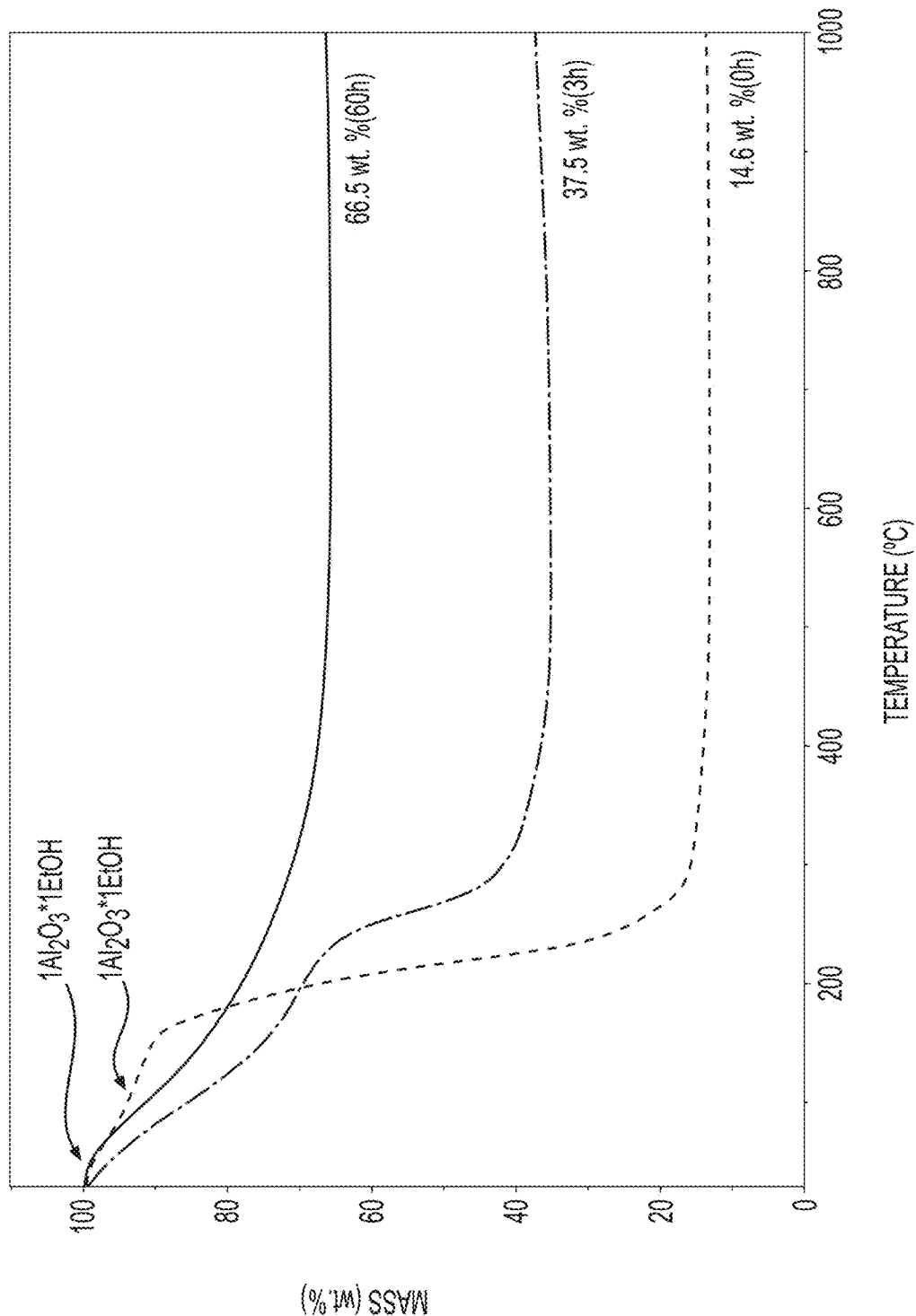
FIG. 9 illustrates a thermogravimetric analysis of the NWs bundles (14.6 wt. %), separated NWs at 60 h of swelling (66.5 wt. %), and an intermediate between them at 3 h of swelling (37.5 wt. %).

During Stage I of the de-alloying reaction (e.g., about 1-5 min), the alcohol molecules preferentially react with the Li-rich grain boundaries, forming short (e.g., about 1 μm) NWs which separate grains from each other (e.g., see FIGS. 8-9B). During the next 15 min or so, ethanol initiates reactions with Al-rich phases and the length of the NWs increases (e.g., to about 5-10 μm), as seen in SEM micrographs and corresponding EDS mappings (e.g., see FIGS. 3A-3D).

The bundles (C in the EDS maps of FIGS. 3B and 3D) are homogenously formed around the Al-rich core. The cracks on the surface seen in FIGS. 3A-3B may be caused by the drying of the sample during the SEM preparation. The drying process may also cause slight detachment of the NWs bundles from the surface of the grain.

The formation of a visible protective layer on top of NW bundles is indicative of the inward growth of the NWs from the surface to the core of the grain. No other species apart from the NWs bundles are seen, which is characteristic of the unique conversion of Al—Li alloy to the NWs.

Figure 4A:
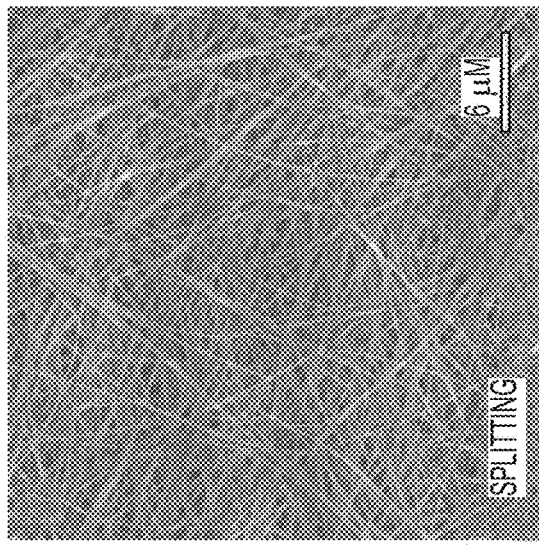
FIGS. 4A-4D illustrate morphologies of (FIG. 4A) NW bundles, (FIG. 4B) separated NWs after 60 h treatment of the bundles in ethanol, (FIG. 4C) the degraded NWs formed after treatment in ethanol for 168 h, and (FIG. 4D) length/diameter (L/D) ratio of the NWs versus reaction time of NWs bundles with ethanol.
Figure 4B:
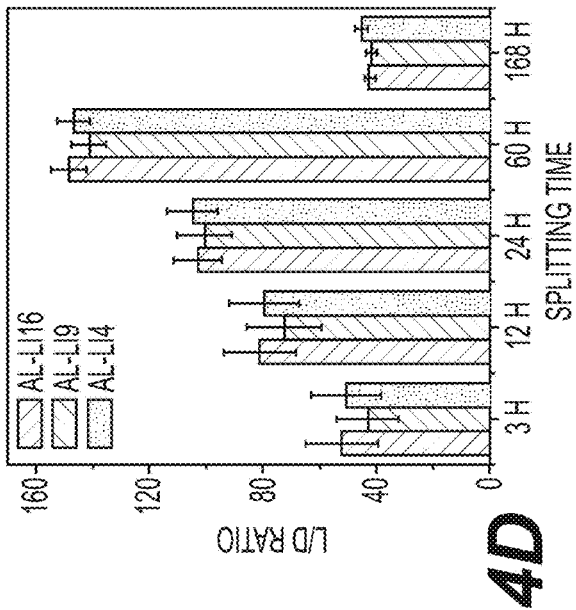
Figure 4C:
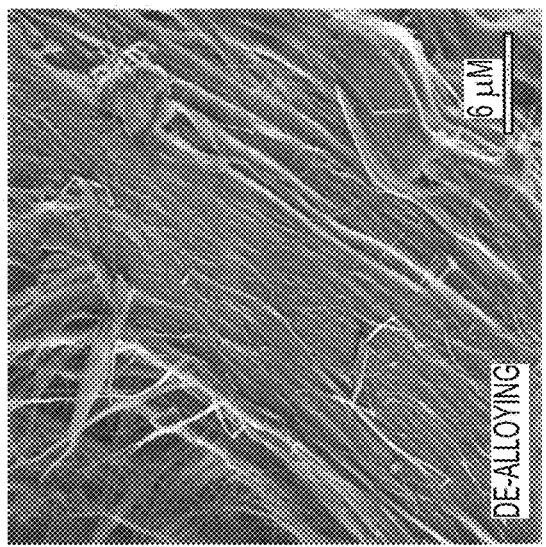
Figure 4D:
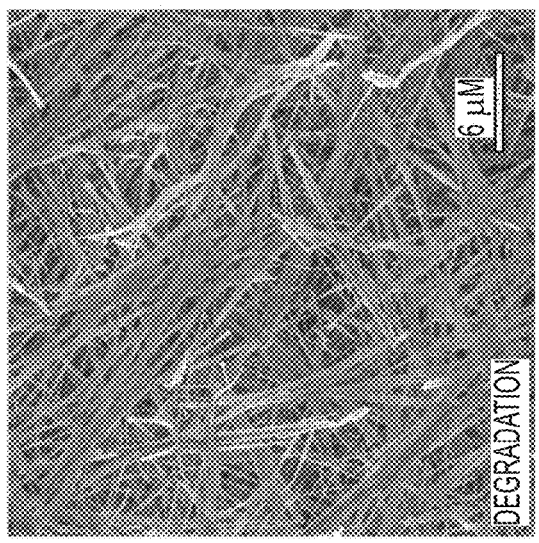

After the treatment in ethanol at about 25° C. and drying, no separated NWs could be detected even after the completion of the de-alloying reaction. The produced ethoxide structures remain in the form of large bundles (e.g., see FIG. 4A), where individual NWs branches are distributed. Simple sonication cannot exfoliate bundles into individual NWs. However, a large number of individual NWs together with a few much smaller diameter bundles (e.g., about 50-200 nm) may be prepared upon subsequent treatment of the decanted bundles in fresh ethanol (in some designs, preferably at a slightly elevated temperature of about 60° C. for faster separation). The separated NWs formed upon the subsequent interaction of larger bundles with ethanol (Stage II of splitting) are shown in FIG. 4B. Note that the starting bundles may be washed by fresh ethanol to completely remove Li ethoxide prior to this stage. Interestingly, over-exposure of the samples to ethanol (in our example beyond about 60 h of reaction with ethanol at about 60° C.) induces degradation of the separated NWs, which break into shorter pieces and start re-fusing together (Stage III of degradation, FIG. 4C). From the SEM micrographs, the inventors estimate the average aspect ratio of the NW bundles as a function of the treatment time in ethanol (e.g., see FIG. 4D). Independent of the original alloys, the "optimal" time for the splitting of NW bundles in ethanol was found to be ~60 hours (~3 days) in this particular experiment.

The inventors used Al magic-angle spinning (MAS) solid-state NMR and $^1$H/$^{13}$C solution NMR spectroscopy to gain insights into the chemical transformations as bundles gradually transformed to separated NWs and finally to degraded NWs. These NMR studies were particularly useful for understanding how aluminum ethoxide polymer networks form and evolve. The Al MAS solid-state NMR revealed that, in the bundles, the Al atoms are largely present in the six-coordinated state ($Al^{VI}$) with a very characteristic isotropic chemical shift at −40-0 ppm (e.g., see FIG. 5A). The formation of the six-coordinated Al atoms has been commonly observed in many polymerized metal alkoxides, where strong bridging bonds between Al and oxygen donors (e.g. ROH, RO, O) are formed and serve as stable building blocks for polymer chains.

FIG. 9 illustrates a thermogravimetric analysis of the NWs bundles (14.6 wt. %), separated NWs at 60 h of swelling (66.5 wt. %), and an intermediate between them at 3 h of swelling (37.5 wt. %). The TGA revealed significantly higher weight losses of bundles upon their conversion to $Al_2O_3$ as compared to the weight losses of separated NWs (e.g., see FIG. 9). Specifically, the inventors estimate that the molar ratio of EtOH to Al atoms changes from nearly 6.2 to 1 in the case of bundles to 0.4 to 1 in the case of separated NWs, respectively (e.g., note: the ratio of EtO to Al is 3 to 1 in case of monomeric $Al(EtO)_3$). More generally, in some designs, the molar ratio of EtOH to Al atoms may range from 0.01-to-1 to 10-to-1 in NW bundles, respectively, and from 0.01-to-1 to 5-to-1 in the separated NWs, respectively. The intermediate sample between the NWs and bundles (e.g., about 3 h splitting in ethanol at about 60° C.) showed intermediate content of the carbon-based groups, as expected for the gradual transformation of bundles to NWs.

Figure 10:
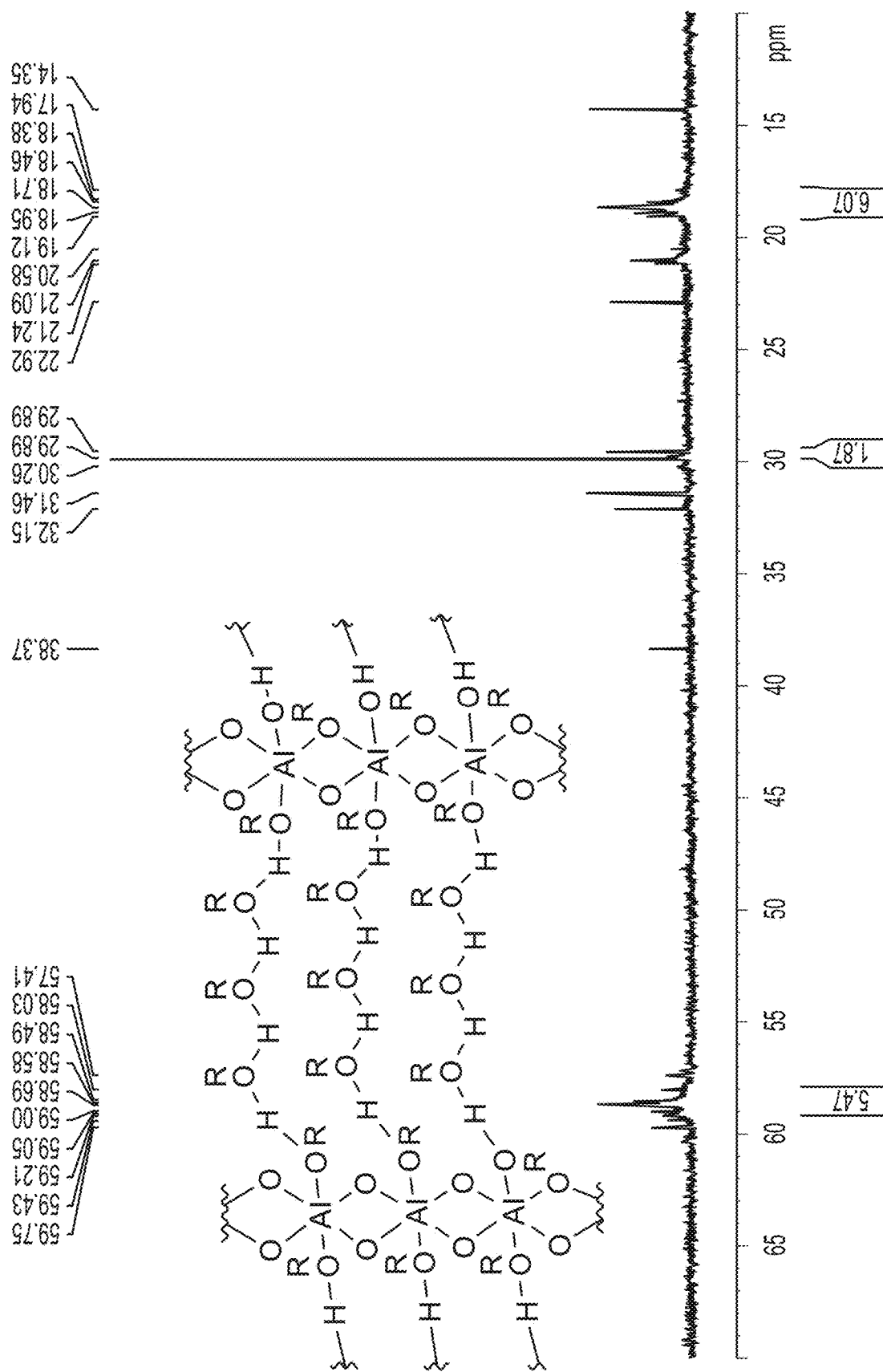
FIG. 10 illustrates a 700 MHz 13C NMR of NW bundles in $CDCl_3$.
Figure 11:
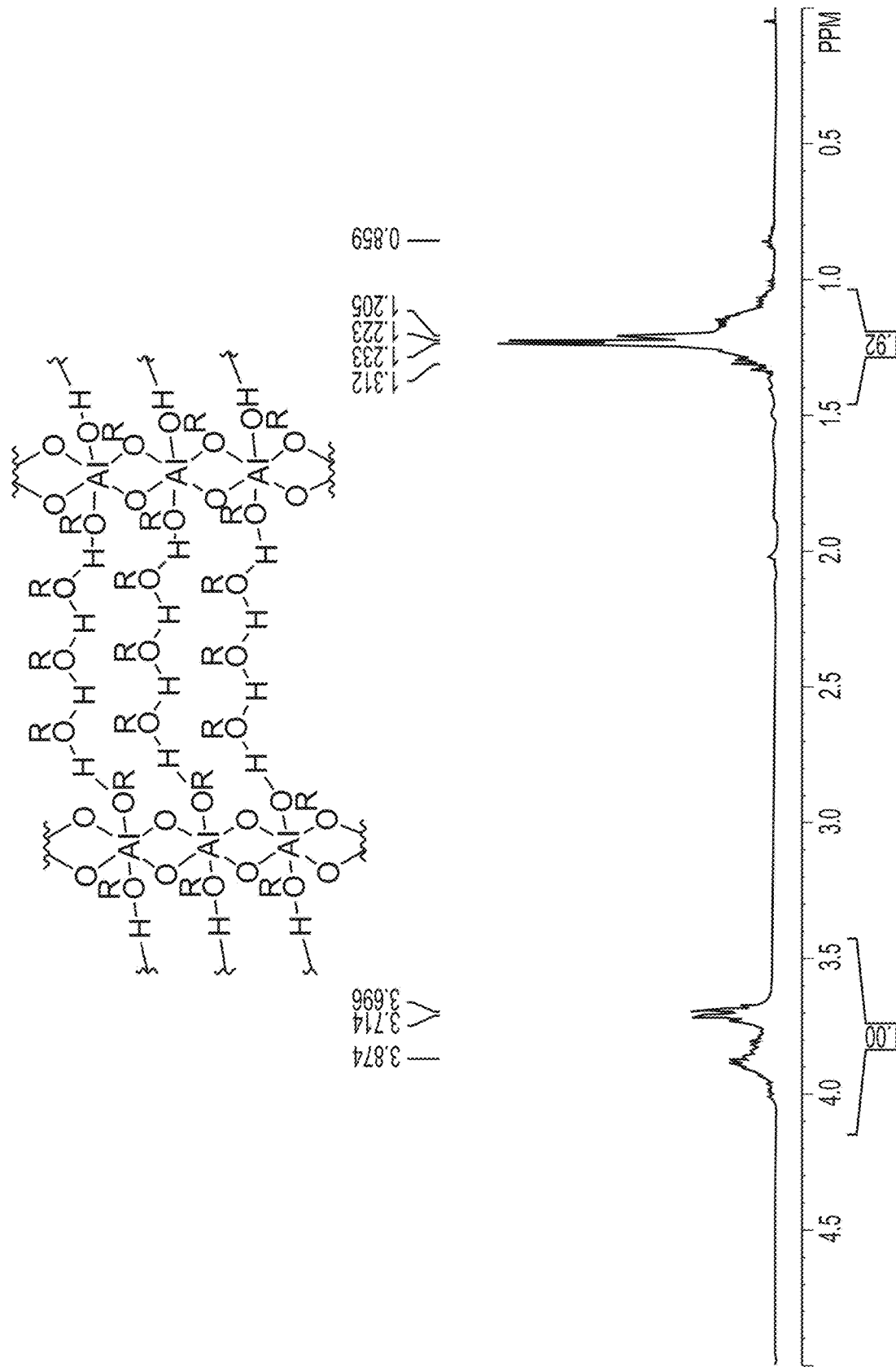
FIG. 11 illustrates a 400 MHz $^1H$ NMR of NW bundles in $CDCl_3$.
Figure 12:
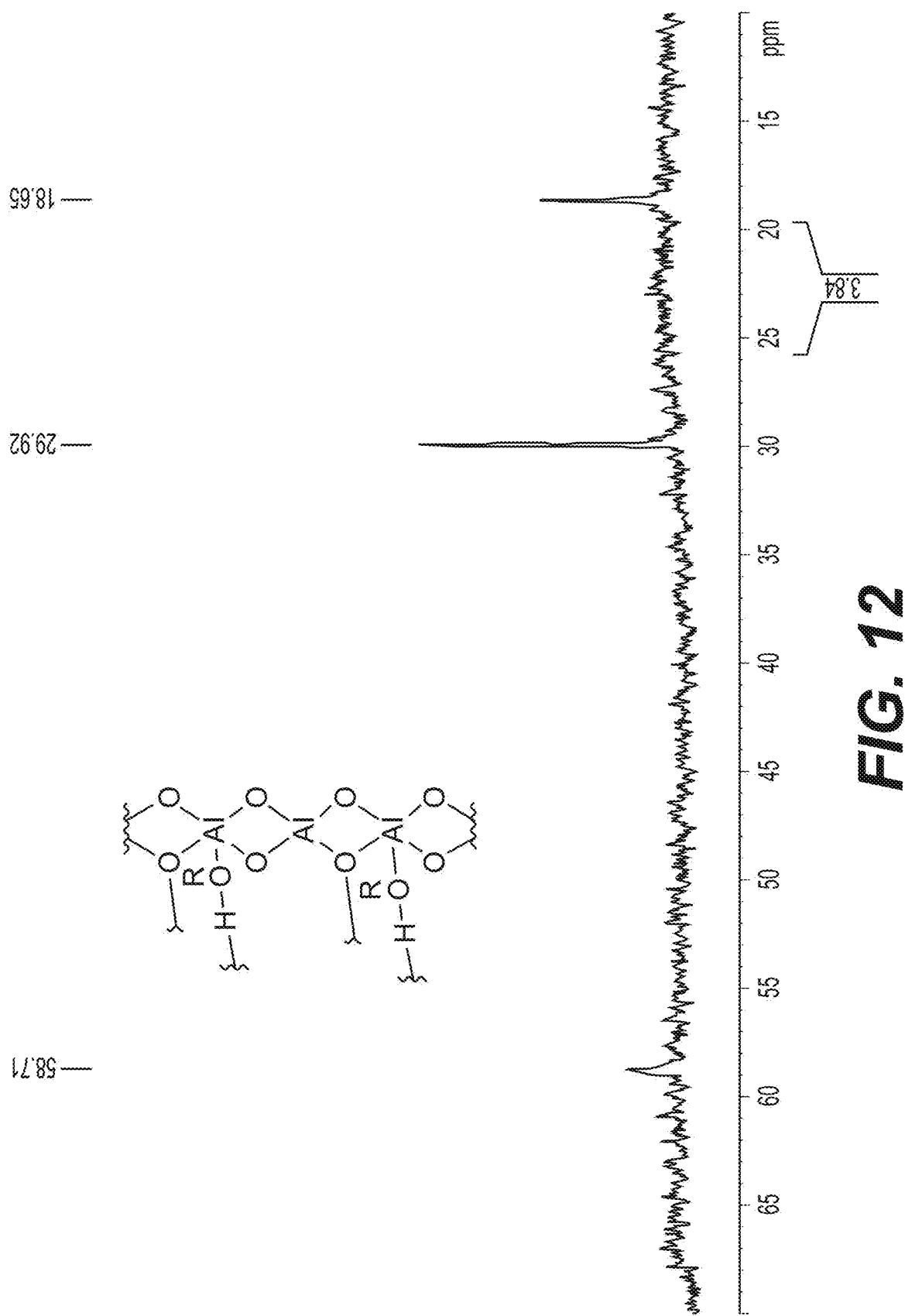
FIG. 12 illustrates a 700 MHz $^1H$ NMR of separated NWs in $CDCl_3$.
Figure 13:
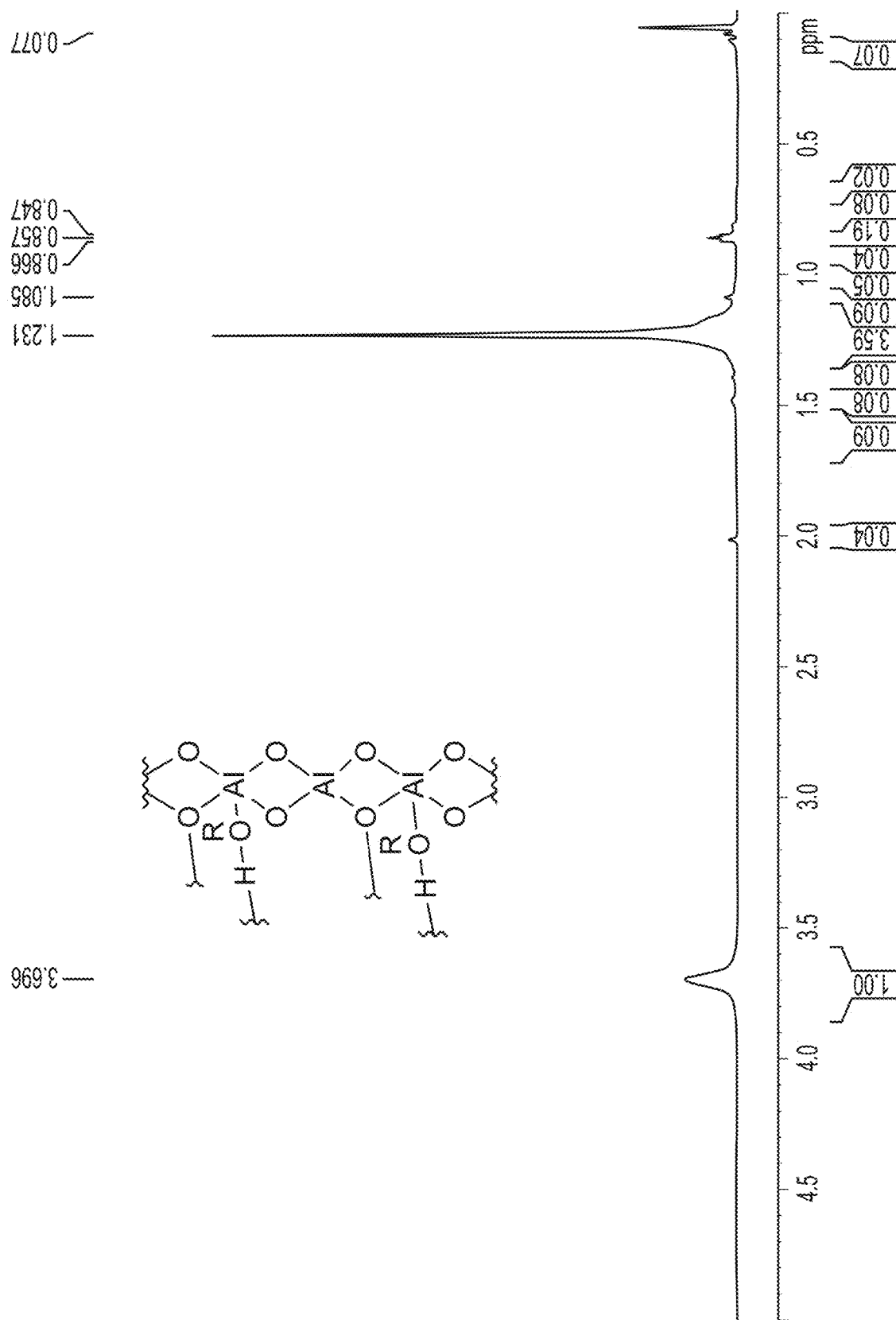
FIG. 13 illustrates a 700 MHz $^{13}C$ NMR of separated NWs in $CDCl_3$.
Figure 14:
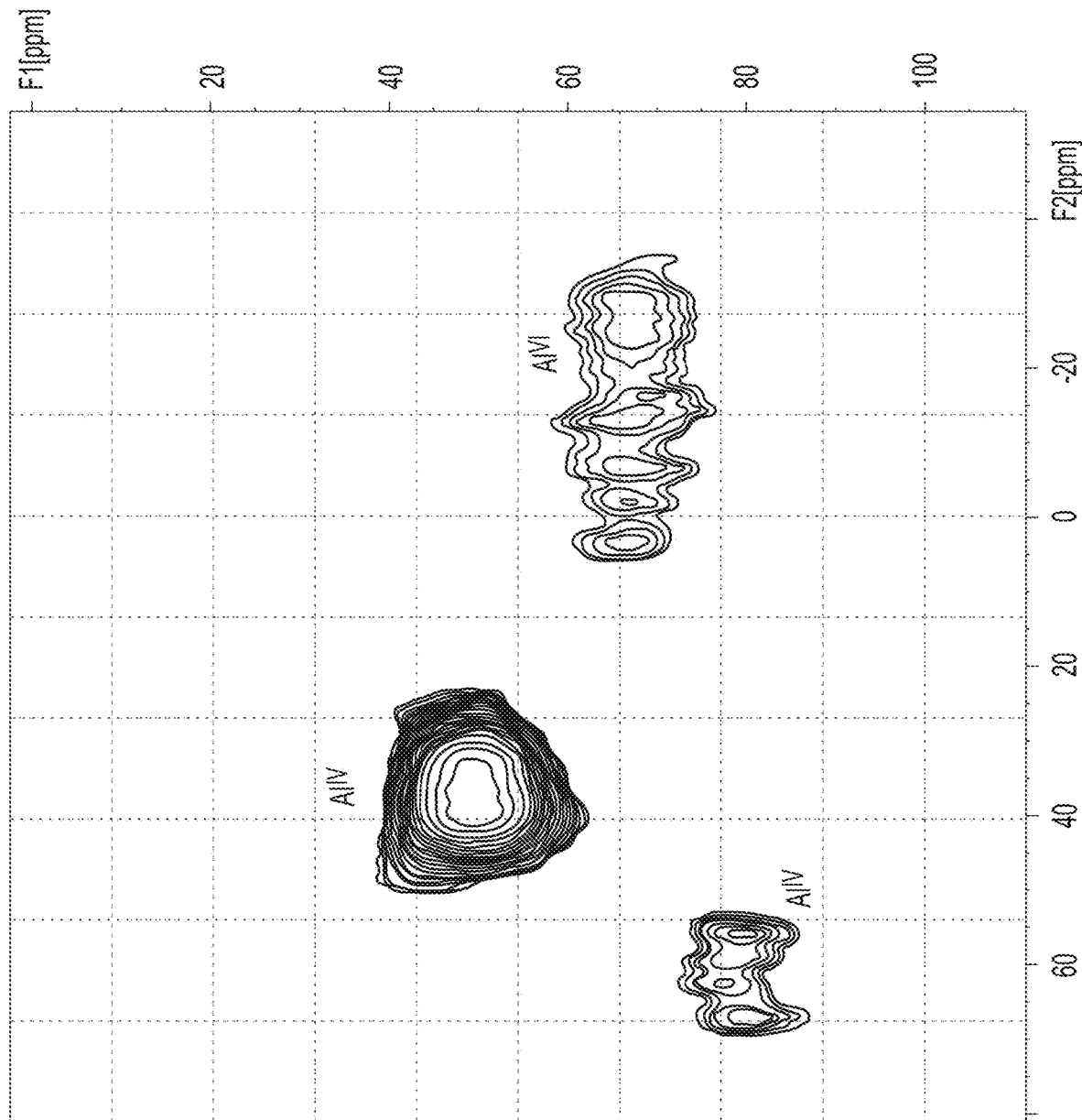
FIG. 14 illustrates an Al MAS NMR of degraded NWs.

FIG. 10 illustrates a 700 MHz 13C NMR of NW bundles in $CDCl_3$. FIG. 11 illustrates a 400 MHz $^1H$ NMR of the NW bundles in $CDCl_3$. FIG. 12 illustrates a 700 MHz $^1H$ NMR of separated NWs in $CDCl_3$. FIG. 13 illustrates a 700 MHz $^{13}C$ NMR of separated NWs in $CDCl_3$. FIG. 14 illustrates an Al MAS NMR of degraded NWs.

The $^{13}C$ NMR spectrum of the bundles is characterized by multiple resonances (e.g., see FIG. 10). Such complexity of the $^{13}C$ NMR of the bundles indicates a hindered environment around the Al atoms. Similar to the steric hindrance in polyethyleneglycol as explained in "Macromolecules" (1990) by Harada, A. and Kamachi, M, the hindered Et groups in bundles, although being chemically equivalent, are not equivalent in NMR due to the limited degree of freedom. The precise assignment of all the peaks in $^{13}C$ NMR is challenging and beyond the scope of this work. Analogous to the $^{13}C$ NMR spectrum, multiple complex resonances are seen in $^1H$ NMR (e.g., see FIG. 11). Based on the analysis of integral intensity of OH groups in the $^1H$ NMR and TGA, the inventors conclude the presence of a large amount of ethanol which is in accordance with the TGA of the bundles.

Figure 5B:
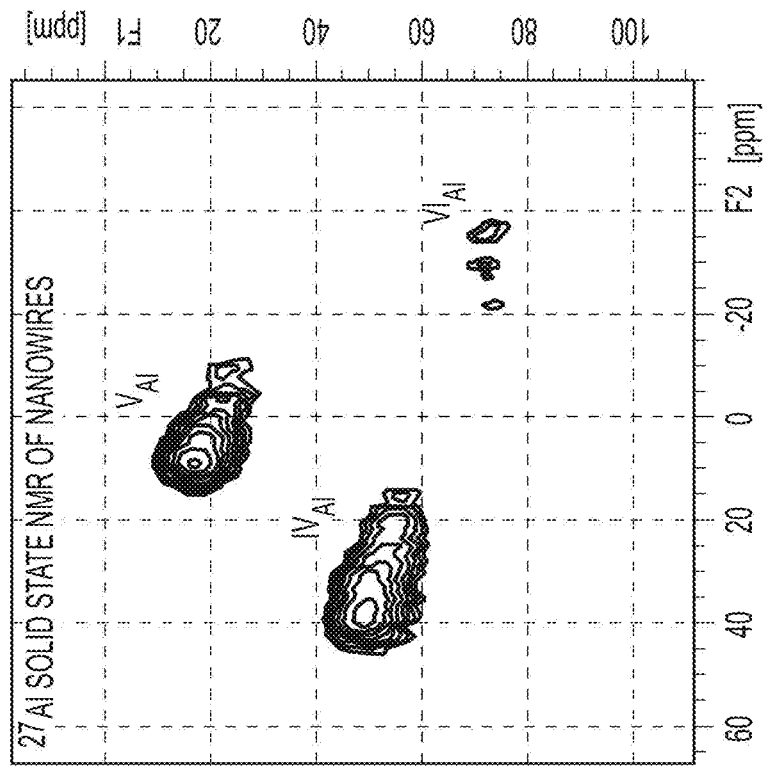
Figure 5A:
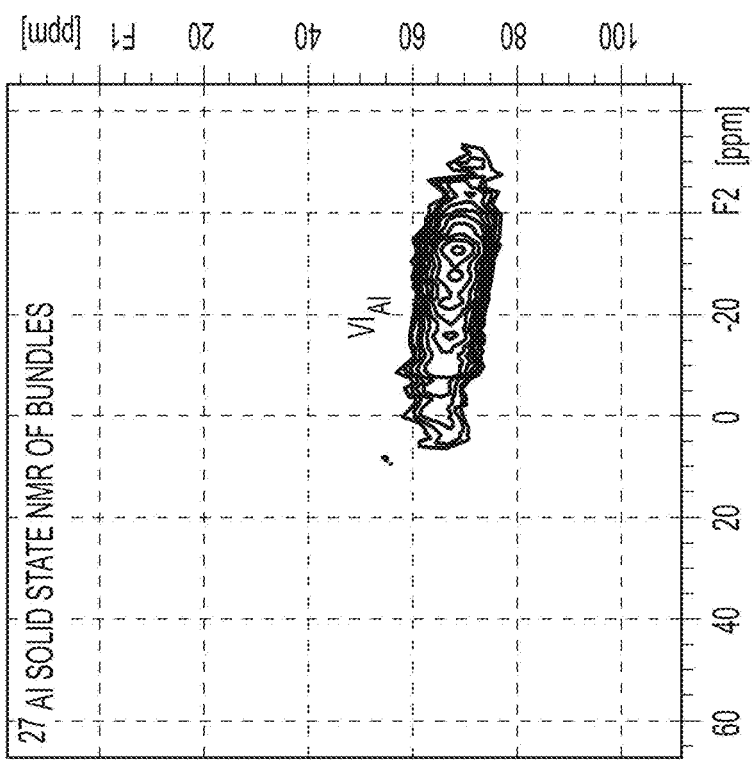

Based on the TGA and NMR results, the inventors can assume that the main building block of NWs involves O (oxy, μ-O) and ROH groups which are linked to $Al^{VI}$ (e.g., see FIG. 5C). Per our calculations of EtOH ratio per 1 mol of Al, the inventors expect that 4 to 5 EtOH molecules can participate in the H-bonding between the polymer chains per 1 Al atom (e.g., see FIG. 5C). The Al atoms in the mostly individualized Al alkoxide NWs (60 h splitting, FIG. 4B) exhibit mainly coordination numbers of four and five ($Al^{IV}$ and $Al^V$), while the presence of $Al^{VI}$ is almost negligible. Since $Al^{IV}$ and $Al^V$ are formed from $Al^{VI}$ and the content of ethanol significantly reduces, the inventors propose that inter-links are lost between the polymer chains (e.g., see FIGS. 5C-5D). The presence of $Al^V$ suggests that H-bonding is still present since one of the oxygen containing groups does not form a bridge and can still participate in the inter-molecular H-bonds, linking chains into NWs (no H-bonds between the chains would result in pure $Al^{IV}$). In other designs, the contribution of hydroxy (OH) groups may be beneficial to the NWs growth and their mechanical stiffness by means of the formation of OH—Al coordination bonds and hydrogen-bonds.

The $^{13}C$ and 1H NMR spectra of the separated NWs support our assumption that the result of the disproportionation is a less hindered environment for Al atoms (e.g., see FIGS. 12-13).

According to the above analysis of NMR and TGA results, the formation of individual NWs from bundles can be related to the breakage of some of the inter- and intra-molecular bonds as well as NW shrinkage accompanied by the disproportionation of octahedral Al alkoxides to the simpler tetrahedral and 5-vertex polyhedra Al atoms. The majority of H-bonded ethanol molecules are lost during the disproportionation reactions. FIGS. 5C-5D show the schematic illustration of changes of chemical composition in the corresponding NWs structures. Here, the inventors used just two representative polymer chains (perfectly straight for simplicity) in bundles and separated NWs to explain how the coordination number of Al as well as the functional moieties change during Stage II of splitting. The key process involves the desaturation of 6-coordinated Al to a lower coordination number Al atom, loss of ethanol associates and H-bonding.

Additionally, the inventors utilized the $^{27}Al$ MAS NMR to track changes in the coordination number of Al that take place during over-exposure of NWs in ethanol at 60° C. (e.g., see FIG. 3D). The results indicate that degraded NWs exhibit only $Al^{VI}$ (e.g., see FIG. 14), whereas $Al^V$ is absent. This observation suggests that the presence of $Al^V$ is critical for maintaining bridges between individual chains, so as to keep structural integrity and adequate mechanical properties of the NWs.

Figure 6:
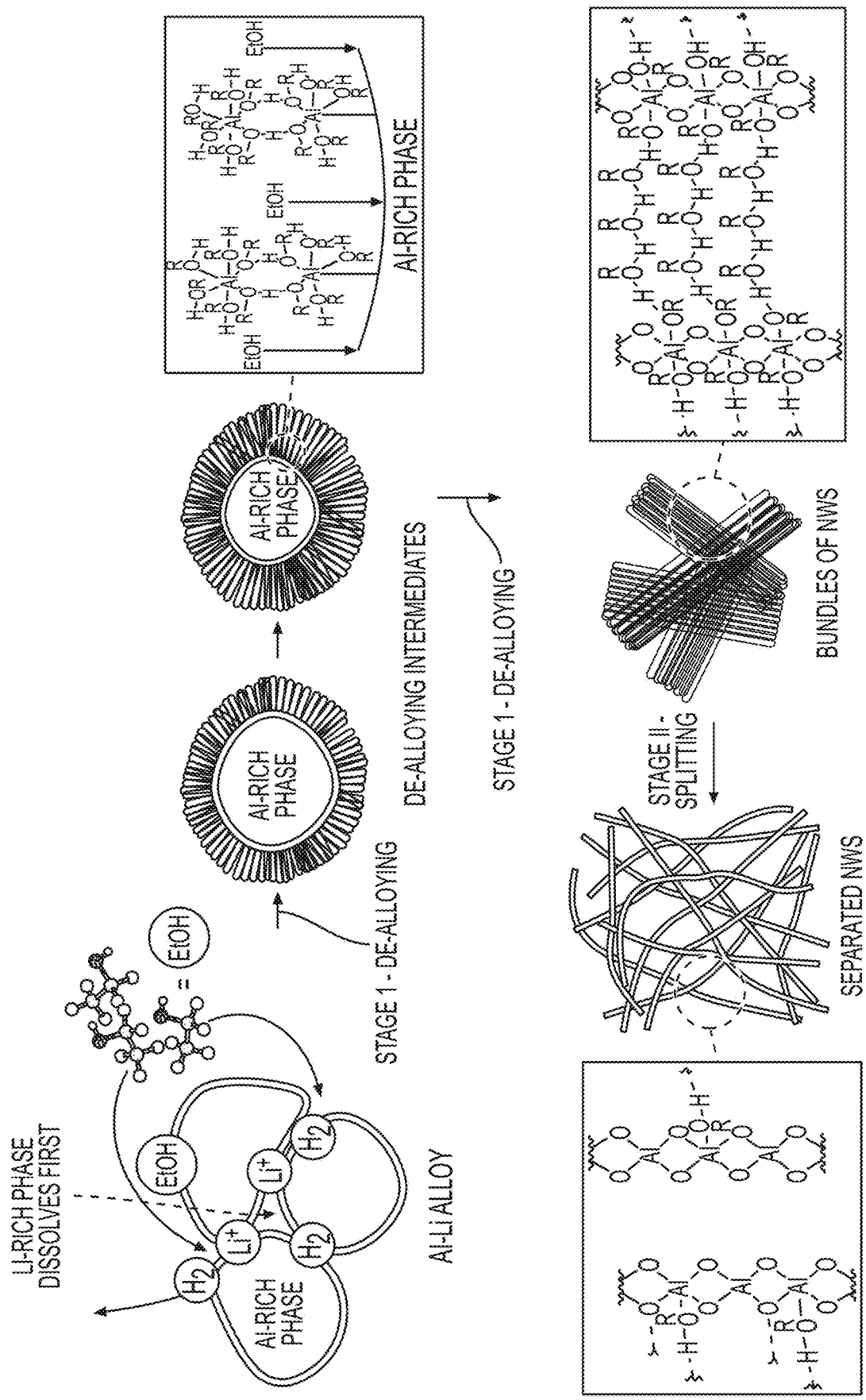
FIG. 6 illustrates a schematic representation and molecular mechanism of the formation of polymer ethoxide NWs as a result of exposure of the Al—Li alloys to anhydrous ethanol. For simplicity, individual NWs are represented by single chains.

FIG. 6 shows an expanded molecular model depicting the critical stages of NW formation upon exposure of AlLi alloys to anhydrous ethanol in accordance with an embodiment of the disclosure and based on the SEM, EDS, NMR and TGA studies discussed above. During Stage I of de-alloying, exposure of the pellet results in the diffusion of ethanol molecules into Li-rich grain boundaries. Fresh Al is activated to react with ethanol whereas the continuous supply of Al atoms from the bulk grain towards the surface results in the formation of bundles consisting of inter-connected long polymer chains. The formation of polymer chains is highly dependent on the ability of the oxygen-donor atoms to form stable bonds with Al. Initially, the fresh Al at the surface of the alloy reacts with ethanol to form the mononuclear complex of Al with EtOH groups, the immediate association of which with subsequent Al monomer occurs through the formation of H-bonds. The latter disproportionate with the formation of bridging O atoms, whereas the remaining EtOH groups remain linked with Al. More of the surface Al atoms react with the ethanol supplying more $Al^{VI}$, whereas EtOH groups serve as a source of H-bonds to the side polymer chains. The presence of multiple H-bonds between the polymer chain results in strong interlinkages between the polymer chains. During stage II of splitting, reactions at elevated temperatures (e.g., about 60° C.) break Al—O bonds at the octahedral vertices with the release of ethanol molecules and split of bundles into much thinner separated NWs.

In spite of very low solubility of Al ethoxide in ethanol, it is also possible that a portion of Al atoms are escaping the polymerization sites in the form of soluble (e.g. $Al(OEt)_4^-$ or $Al(OEt)_6^-$) anions because according to our estimations the yield of the alkoxide NWs in the reaction between the Al—Li16 alloy and ethanol is 60-70 wt. %. Such losses, however, may be reduced by fine-tuning the reaction/polymerization conditions.

The final length of the NWs may be controlled by the number of Al atoms in the Al—Li alloy grain and thus the grain diameter, while the diameter of the NWs may be controlled by the chemomechanical effects. The aspect ratio of the NW may thus be tunable and optimized for specific applications. In some designs, a suitable aspect ratio may range from around 10 to around 10,000,000 (e.g., most commonly—from around 50 to around 10,000).

In summation, the inventors have demonstrated additional details of the transformation mechanism of bulk AlLi alloys to metal-organic Al alkoxide NWs. This transformation has several stages. During Stage I (de-alloying), the ethanol solvent molecules first etch through the Li-rich grain boundaries in the AlLi alloy forming soluble Li ethoxides. Consequently, the ethanol reacts with the surface of each grain, forming Al ethoxides in the shape of the NWs, whose growth is directed towards the center of each grain. Therefore, the length of the NWs is proportional to the length of the AlLi alloy grains. The de-alloying stage is seen throughout the AlLi alloy with as little as 4 wt. % of Li in the alloy. The NWs initially form tightly linked bundles, which could be transformed into individually separated NWs by simply heating them in ethanol (Stage II, the splitting process). This process changes the coordination number of Al atoms from VI to V and IV, triggers the release of ethanol molecules and leads to the eventual disappearance of H-bonds that hold Al ethoxide chains.

Additional details related to the above-noted experimentation will now be provided.

In terms of materials, lithium foil (Battery grade, 0.75 mm, Sigma Aldrich), Aluminum pellets (3-12 mm, 99.99% trace metals basis, Sigma Aldrich), Ethyl Alcohol (Pure, 200 proof, anhydrous, >99.5%, Sigma Aldrich) was used.

In terms of Al—Li alloy synthesis, three different Al—Li alloys were synthesized following our previous strategy. In particular, Al and Li were rapidly heated to 750° C. (~895° C./min) in a graphite crucible with an induction heater. The heating was stopped once reaching about 750° C. and allowed to cool in Ar (cooling rate of ~150° C./min).

In terms of Al alkoxides bundle synthesis, an alloy pellet was placed in ~30 mL of anhydrous ethanol for different time (ca. ~24 h for Al—Li16, ca.~150 h for Al—Li9, and ca. ~340 h for Al—Li4) without stirring/agitation. After initial reaction, the pellet transformed into soluble Li alkoxides, while Al alkoxide do not dissolve and form in the shape of NWs (often, bundled NWs). Then, the delithiated sample was washed with an extra 20 mL of anhydrous solvent at least 3 times to remove soluble Li alkoxides. Subsequently, Al alkoxide bundles were immersed into 15 mL anhydrous ethyl alcohol.

In some designs, it may be advantageous to avoid a washing step and directly proceed to evaporation of the residual solvent after reaction followed by the heat treatment of the resulted NWs in order to synthesize Li-containing or Li-doped ceramic NWs. In some designs, it may similarly be advantageous to add Li-based compounds, such as lithium oxide, lithium aluminate, lithium hydroxyde or lithium carbonate, to the reaction mixture before the evaporation of residual solvent. In some designs, it may be advantageous to add Li-based compound, such as lithium oxide, lithium aluminate, lithium hydroxyde or lithium carbonate, in a form of a powder to the powder of metal-organic NWs before the thermal treatment. In some designs, Li content in the NWs may be varied from 0.01 wt. % to 30 wt. %. In some designs, lithium aluminates ($LiAlO_2$), or mixed lithium aluminate/aluminum oxide ($LiAlO_2$—$Al_2O_3$) or mixed lithium aluminate/lithium oxide/aluminum oxide NWs may be formed.

In one example, individual Al alkoxides NWs may be produced from Al alkoxide NW bundles, by heating Al alkoxide NW bundles immersed in dry ethanol up to about 60° C. After about 60 h the NW bundles were observed to be completely converted into the individualized NWs under Argon protection in one example. In some designs, NW bundles may be treated in a gaseous phase (e.g., alcohol vapors instead of liquid alcohol). In some designs, the pressure may be different than atmospheric—for example, be either above or below the atmospheric pressure. In some designs, treatment temperature may be below about 60° C. (e.g., in the range from about 20.0° C. to about 60.0° C.), particularly if treatment is conducted at elevated pressures or for a prolonged time. In some designs, treatment temperature may be above 60° C. (e.g., in the range from about 60.0° C. to about 160.0° C.). However, care must be taken in identification of suitable treatment conditions. Too high temperature in combination with too high pressure may induce undesirable damages and disintegration of the NWs. In some designs, a higher pressure may generally require shorter time and lower partial pressure of alcohols during splitting the bundles into the individual NWs. In some designs, NW bundles can be separated into individual NWs using sonication or agitation conditions (e.g., in an organic solvent, such as alcohols or others). In some other designs, for example, chemical reactivity of nucleophilic agents such as alcohols or amines of a general formula ROH and $RNH_2$ (in which R can be hydrogen, $NH_2$, OH, alkyl, $C_nH_{2n+1}$, hydroxyalkyl, aminoalkyl, carboxyalkyl, cycloalkyl, alkenyl, alkynyl, aryl, phenyl ($C_6H_5$), naphtyl, heteroaryl, alkylphenyl, cyclohexyl, polycyclic aryl), respectively, may be used effectively to enable splitting bundles into separated individual NWs.

In terms of measurement, SEM images were obtained using an electron microscope Hitachi SU8230 SEM equipped with an Oxford Instruments Aztec Energy EDX system. Transmission electron microscopy (TEM) images were recorded on a JEOL TEM 4000EX (JEOL, Japan) operating at 300 kV. The powder X-ray was performed by using PANalytical Empyrean XRD system with Cu-Kα radiation to identify the crystalline phase of the composite. Thermogravimetric analysis (TGA) was conducted on TGA Q600 analyzer (TA instruments, USA) under air atmosphere at a heating rate of 5° C.·$min^{-1}$. The solid-state 2D 3QMAS 27Al NMR was recorded at about 25° C. with spinning about 12 kHz on a 400 MHz Bruker Avance III spectrometer. 1H and 13C spectra was acquired on Bruker 700 in $CDCl_3$.

Figure 15:
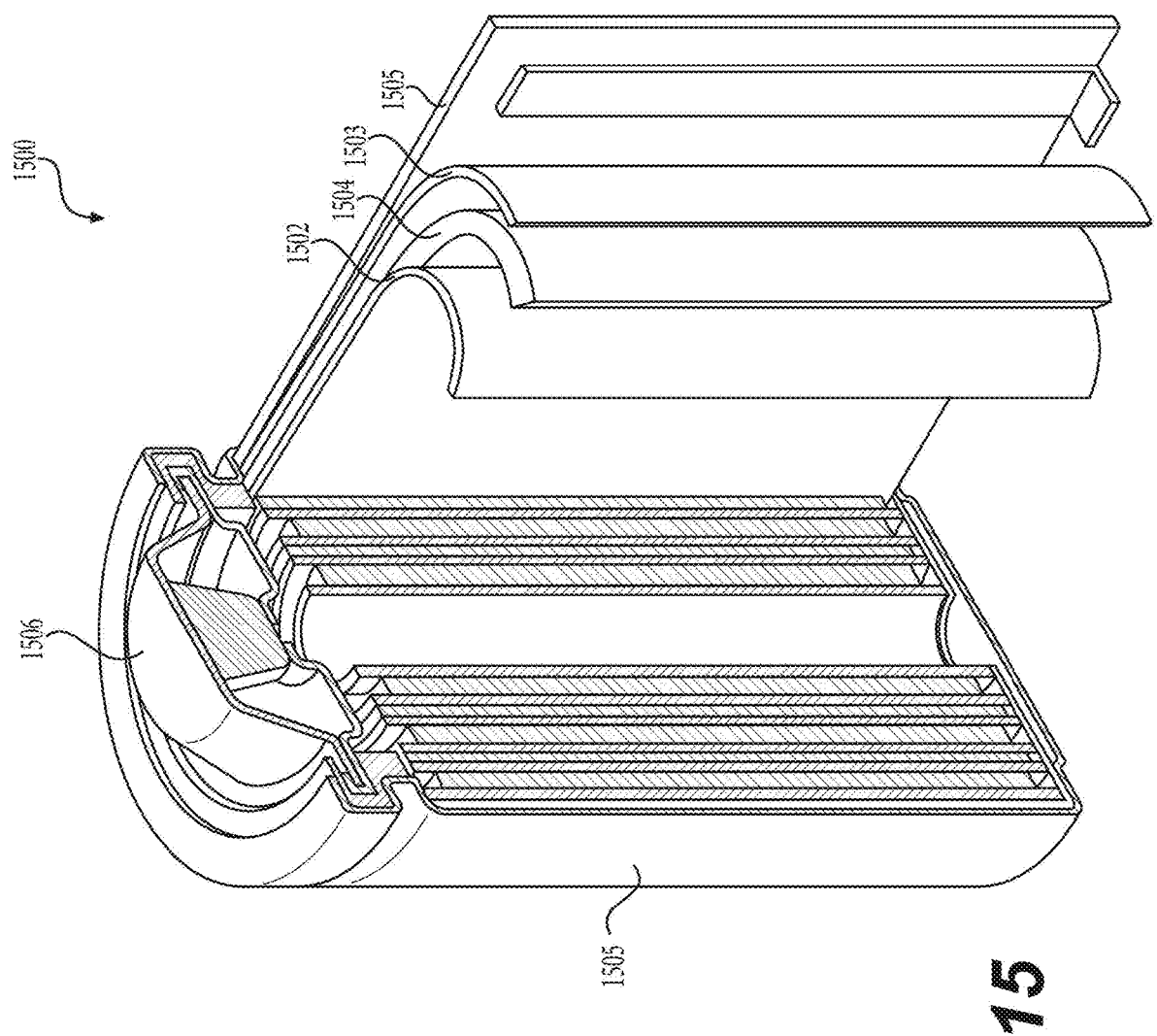
FIG. 15 illustrates an example (e.g., Li-ion or Na-ion, etc.) battery in which the components, materials, methods, and other techniques described herein, or combinations thereof, may be applied according to various embodiments.

FIG. 15 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) or flexible or coin-type batteries, may also be used as desired. The example battery 1500 includes a negative anode 1502, a positive cathode 1503, a separator 1504 interposed between the anode 1502 and the cathode 1503, an electrolyte (not shown) impregnating the separator 1504, a battery case 1505, and a sealing member 1506 sealing the battery case 1505. The separator 1504 may comprise ceramic NWs (e.g., MgO NWs, $Al_2O_3$ NWs, mixed Al—Mg—O NWs, lithiated aluminum oxide or aluminum oxyfluoride NWs, etc.), which may be produced according to some embodiments of the present disclosure.

While the above-noted experimentation relates specifically to Al alkoxide NW synthesis and associated Al alkoxide NWs, embodiments of the disclosure are more broadly directed to metal-organic NWs and metal-organic NW synthesis in general, and is not limited to Al alkoxide-based NWs, as emphasized below via the description of the process of FIGS. 16-18.

Figure 16:
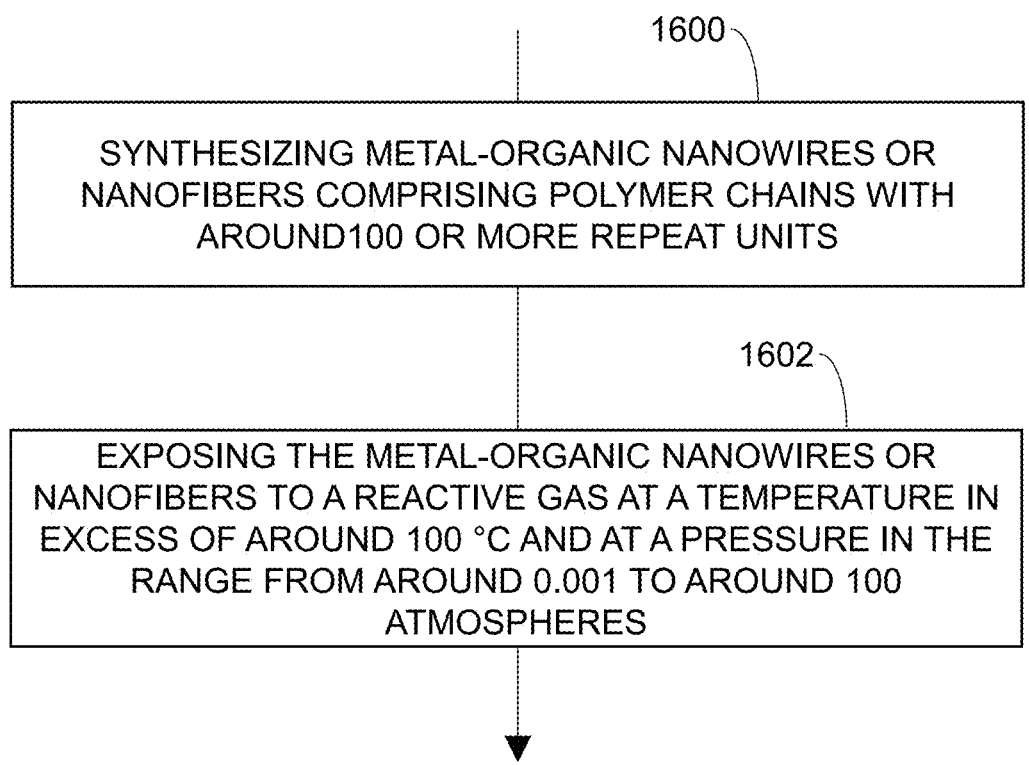
FIG. 16 illustrates a process of manufacturing nanowires (specifically, metal-organic nanowires) in accordance with an embodiment of the disclosure.

FIG. 16 illustrates a process of manufacturing nanowires (specifically, metal-organic nanowires) in accordance with an embodiment of the disclosure. At 1600, metal-organic nanowires or nanofibers comprising polymer chains with around 100 or more repeat units are synthesized. At 1602, the metal-organic nanowires or nanofibers are exposed to a reactive gas at a temperature in excess of around 100° C. and at a pressure in the range from around 0.001 to around 100 atmospheres.

Referring to FIG. 16, in some designs, one or more of the polymer chains within the metal-organic nanowires or nanofibers are linked to a group of nearest neighbor polymer chains with intermolecular bonds. In some designs, the intermolecular bonds comprise coordination bonds, donor-acceptor bonds, hydrogen bonds, van-der-Waals bonds, or a combination thereof.

Referring to FIG. 16, in some designs, an average aspect ratio of the metal-organic nanowires or nanofibers exceeds about 100. In some designs, the metal-organic nanowires or nanofibers comprise metal alkoxide nanowires or nanofibers. In some designs, the metal-organic nanowires or nanofibers comprise metal alkoxide nanowires or nanofibers. In some designs, the metal-organic nanowires or nanofibers comprise one or more of aluminum (Al), magnesium (Mg) and lithium (Li) metals. In some designs, the metal-organic nanowires or nanofibers are oxide, nitride, oxynitride, fluoride or oxyfluoride nanowires or nanofibers. In some designs, the oxide, nitride, oxynitride, fluoride or oxyfluoride nanowires or nanofibers are amorphous or nanocrystalline with an average grain size below about 100 nm.

Referring to FIG. 16, in some designs, the reactive gas comprises oxygen (O) molecules. For example, the reactive gas comprises air, and the exposure to the reactive gas at 1602 takes place at an ambient pressure (e.g., around 1 atm. or slightly higher). In some designs, the reactive gas comprises oxygen (O) atoms in its chemical composition.

Referring to FIG. 16, in some designs, the nanowires or nanofibers produced in accordance with the process of FIG. 16 may be integrated into a membrane or composite composition (e.g., a separator membrane, such as the separator 1504 of FIG. 15). The membrane or composite composition may further be incorporated, for example, into a Li-ion battery composition. Alternatively, individual (e.g., ceramic) NWs, membranes or composite compositions may be incorporated into gas or liquid filters (e.g., purifiers), including HEPA filters. Yet alternatively, the individual (e.g., ceramic) NWs, membranes or composite compositions may be used as/in structural components (e.g., auto or aero body parts or structural components also comprising metals or polymers or glass), including, in some designs, transparent or semi-transparent membranes or components. Yet alternatively, the individual (e.g., ceramic) NWs or membranes or composite compositions may be used as components of concretes.

FIG. 17 illustrates an example implementation of 1600 of FIG. 16 in accordance with an embodiment of the disclosure. At 1600, metal-organic nanowires or nanofibers are synthesized by immersing a bimetallic alloy in at least one solvent. Accordingly, the immersion of 1700 of FIG. 7 is one example of how the metal-organic nanowires or nanofibers may be synthesized at 1600 of FIG. 16.

Referring to FIG. 17, in some designs, the bimetallic alloy (prior to the immersion) is in the form of a ground powder with an average volume of individual particles or pellets below around 1 cm$^3$ (in some designs, below about 10 mm$^3$). In some designs, the bimetallic alloy is an Al—Li or Mg—Li alloy with a content of Li in the range from around 4 wt. % to around 50 wt. %.

With respect to FIGS. 16-17, at least part of the synthesis of 1600 or 1700 may occur at room temperature or at near room temperature or at moderately elevated temperature (e.g., between about 0° C. to around 100° C.) and at ambient pressure in some designs (e.g., at our around 1 atm. or slightly higher). In some designs, the metal-organic NWs are Al alkoxide NWs, the at least one solvent includes one or more anhydrous alcohols, and the bimetallic alloy is an Al—Li alloy with a content of Li at about 2-4 wt. % or more. In some designs, elevated pressures (e.g., up to around 1000 atm. may be utilized).

FIG. 18 illustrates an example implementation of the process 1700 in accordance with an embodiment of the disclosure. At 1800, a first synthesis stage is implemented whereby the bimetallic alloy is immersed in a first solvent at a first temperature to produce a set of metal-organic nanowire bundles. At 1802, a second synthesis stage is implemented whereby the set of metal-organic NW bundles is immersed in a second solvent (e.g., which may be the same or different than the first solvent) at a second temperature to separate individual metal-organic nanowires from the set of metal-organic nanowire bundles. In some designs, instead of immersion of the bundles into a second solvent, the NW bundles may be exposed to vapors of the second solvent.

With respect to FIG. 18, in some designs, the first and second solvents each may include one or more anhydrous alcohols, and wherein the second temperature (e.g., about 60° C.) is higher than the first temperature (e.g., between about 0° C. to 50° C.).

In some designs, the metal-organic NWs are further heated in a controlled environment (e.g., air or water vapors/oxygen containing gas or, in some design, in an inert gas) to convert the metal-organic nanowires into ceramic oxide nanowires (e.g., $Al_2O_3$ nanowires). In some designs, the metal-organic NWs may be thoroughly dried from the organic solvent prior to heating, which may be helpful to minimize changes in the NW morphology. In some designs, the (e.g., dried) metal-organic NWs may be exposed to moisture prior to heating, which may be helpful to form stronger intermolecular bonds between the chains or, more generally, to significantly enhance yield of the ceramic NW synthesis (for example, prevent metal-organic decomposition and evaporation prior to converting to the ceramic NWs).

In some designs, the disclosed metal-organic NWs may advantageously (for applications or future conversion to ceramic NWs) comprise versatile surface groups on their surface, examples of which may include but are not limited to oxy, hydroxy, or alkoxy.

In some designs, surface groups onto the metal-organic NWs may be redesigned by exposing produced metal-organic NWs to alcohol reagents, such as methanol or ethanol or others. In some designs, such other reagents may represent alcohols of a general formula ROH (in which R may be hydrogen, $NH_2$, OH, alkyl, $C_nH_{2n+1}$, hydroxyalkyl, aminoalkyl, carboxyalkyl, cycloalkyl, alkenyl, alkynyl, aryl, phenyl ($C_6H_5$), naphtyl, heteroaryl, alkylphenyl, cyclohexyl, polycyclic aryl, to name a few).

In some designs, oxy, hydroxy, or alkoxy ligands which comprise the NWs may be advantageously be exchanged with other ligands. In particular, such ligands may represent oxy, hydroxy, alkoxy, RO, ROH, RNH or $RNH_2$ groups, in which R may be hydrogen, $NH_2$, OH, alkyl, $C_nH_{2n+1}$, hydroxyalkyl, aminoalkyl, carboxyalkyl, cycloalkyl, alkenyl, alkynyl, aryl, phenyl ($C_6H_5$), naphtyl, heteroaryl, alkylphenyl, cyclohexyl, polycyclic aryl or others.

In some other designs, oxy, hydroxy, or alkoxy ligands which present within the NWs may be exchanged by fluorine containing ligands, such as F, difluoromethyl or trifluoromethyl or others. In order to induce the exchange of the fluorine ligands such fluorination agents as DAST, Deoxo-Fluor®, Selectfluor®, NFSI, or Baran DFMS may be used.

In some designs, the metal-organic NWs may be treated (e.g., heat-treated) in reactive gases, such as oxygen-containing gases (meaning gases that comprise oxygen atoms in the composition of at least some individual gas molecules), nitrogen-containing gases, fluorine-containing gases, sulfur-containing gases or carbon-containing gases, among others. In some designs, the treatment temperature may range from around −70° C. to around +1000° C. (in some designs, from 100° C. to around 800° C.; the optimal temperature may depend on the gas and metal-organic NW composition). In some designs, the NWs treated in one type of the reactive gases may be additionally heat-treated in another type of reactive gas(es) or in inert gas or vacuum (e.g., after the treatment in the first reactive gas or reactive gas mixture). In some designs, it may be advantageous to expose (e.g., dry) metal-organic NWs to water vapors prior to or during heat-treatments in reactive gases. In some designs, the partial pressure of water vapors during such exposures may range from around 0.000005 atm. to around 0.5 atm. In some designs, the exposure time may range from around 0.001 hour to around 1000 hours. In some designs, the exposure temperature may range from around −70° C. to around +300° C.

In some designs, the metal-organic NWs may be heat-treated in reactive oxygen-containing gases, such as oxygen or oxygen-containing gases, in order to induce or accelerate formation of the oxygen-containing ceramic NWs of the desired composition. For example, such reactive gases may be represented by but not limited to oxygen, air, ozone, hydrogen peroxide and water vapors. In some designs, at least some of the reactive gases may be at least partially ionized (e.g. be in the form of plasma) at least in one stage of the reaction process.

In some designs, the metal-organic nanowires may be heat-treated in nitrogen-containing reactive gases in order to produce nitrogen-containing or nitrogen-doped ceramic NWs (e.g., nitrides or oxy-nitrides) of the desired composition. In some illustrative examples, such gases may comprise but not limited to ammonia, hydrazine, hydroxylamine, alkyl amines, benzylamines, or other ammonia derivatives, in case of nitridation reaction in order to form the desired NWs. In some designs, N content in the desired NWs can be varied from 0.01 to 40 wt. %. In some designs, metal nitrides, metal oxy-nitrides, or mixed metal nitrides/metal oxy-nitrides, mixed metal nitrides/metal oxides, mixed metal oxy-nitrides/metal oxides, mixed metal nitrides/metal oxy-nitrides/metal oxides NWs may be formed. In some designs, at least some of reactive gases may be at least partially ionized (e.g. be in the form of plasma) at least in one stage of the reaction process.

In some designs, the metal-organic nanowires may be heat-treated in reactive fluorine-containing gases in order to produce fluorine-containing or fluorine-doped ceramic NWs (e.g., fluorides or oxy-fluorides) ceramic nanowires of the desired composition. In some illustrative examples, such gases may comprise nitrogen fluoride, fluorine, fluorine-nitrogen mixtures in order to induce fluorination and produce fluorine-containing ceramics (e.g., fluoride or oxy-fluoride). In yet another illustrative example, such a reactive gas may comprise oxygen-fluorine mixtures to synthesize oxy-fluoride NWs. In some designs, mixed metal fluorides/metal oxides, mixed metal fluorides/metal oxy-fluorides, or mixed metal oxy-fluorides/metal oxides/metal fluorides may be formed. In some designs, at least some of the reactive gases may be at least partially ionized (e.g. be in the form of plasma) at least in one stage of the reaction process.

In some designs, the metal-organic NWs may be heat-treated in reactive carbon-containing gases in order to produce carbon-containing or carbon-doped ceramic NWs (e.g., carbides, oxy-carbides or carbonitrides) ceramic NWs of the desired composition. In some illustrative examples, such gases may comprise methane, acetylene, ethylene, propylene, among others, or their various mixtures (in some designs with nitrogen plasma or ammonia), in order to induce carbonization or carbonitridization and produce carbon-containing ceramics (e.g., carbides, oxy-carbides or carbonitrides). In some designs, at least some of the reactive gases may be at least partially ionized (e.g. be in the form of plasma) at least in one stage of the reaction process.

In some designs, the metal-organic NWs may be heat-treated in sulfur-containing reactive gases in order to produce sulfur-containing or sulfur-doped ceramic NWs (e.g., sulfides or oxysulfides) of the desired composition. In some illustrative examples, such gases may comprise sulfur vapor, hydrogen sulfide, sulfur dioxide, sulfur trioxide among others in order to induce sulfurization or oxo-sulfurization and produce sulfur-containing ceramics. In some designs, at least some of the reactive gases may be at least partially ionized (e.g. be in the form of plasma) at least in one stage of the reaction process.

In some designs, the ceramic NWs (e.g. nitrides, oxynitrides, fluorides, oxyfluorides, sulfides, oxysulfides) (and in some case metal-organic NWs) may be heat-treated in reactive, chemically reducing gases in order to produce all-metallic (or mostly metallic) NWs of the desired composition. In some illustrative examples, such gases may comprise hydrogen, methane, natural gas, acetylene, ethylene, propylene, cyclic hydrocarbons such as benzene and others, other hydrocarbons, carbon monoxide, calcium vapors, magnesium vapors, among other commonly used reducing agents, in order to produce all metallic NWs. In some designs, reactive gases may be diluted in relatively inert gases (e.g., nitrogen or argon or helium, etc.). In some designs, at least some of the reactive gases (e.g., hydrogen) may be at least partially ionized (e.g. be in the form of plasma) at least in one stage of the reaction process. In some designs, the temperature of the chemical reduction process may range from around 250 K to around 1000 K, depending on the melting point of the corresponding metal (it may preferably not exceed 70% of the melting point in kelvin). In some designs, the pressure of the chemical reduction process may range from around 0.01 Torr (approximately $10^{-5}$ atm.) to around 1000 atm. In some designs (e.g., to reduce costs or provide other benefits) it may be advantageous for the chemical reduction process pressure to be around 1 atm. or at least in a more narrow range (e.g., from around 0.002 atm to around 2 atm.).

In some designs, suitable temperature for the oxidation, nitridation, sulfurization, carbonization, reduction and fluorination reactions may range from around room temperature to around 1000° C. The particular optimal treatment temperature may depend on the particular chemistry and dimensions of NWs as too low temperature may be insufficient to induce the needed reaction, but too high temperature may induce undesirable sintering or even material decomposition. In some designs, it may be advantageous to increase temperature gradually (e.g., from around 20-120° C. to the maximum reaction temperature) in order to prevent undesirable changes in the NW morphology. In some designs, it may be advantageous to flow reactive gases during at least a portion of the heating ramp in order to prevent undesirable changes in the NW morphology. In some designs, the pressure of the chemical reaction process may range from around 0.01 Torr (approximately $10^{-5}$ atm.) to around 1000 atm. In some designs (e.g., to reduce costs or provide other benefits) it may be advantageous for the chemical reaction process pressure to be around 1 atm. or at least in a more narrow range (e.g., from around 0.002 atm to around 2 atm.).

This description is provided to enable any person skilled in the art to make or use embodiments of the present invention. It will be appreciated, however, that the present disclosure is not limited to the particular formulations, process steps, and materials disclosed herein, as various modifications to these embodiments will be readily apparent to those skilled in the art. That is, the generic principles defined herein may be applied to other embodiments without departing from the spirit or scope of the disclosure. For example, the described synthesis of flexible ceramic membranes may be used in various composites or separator membrane applications in addition to the described use in energy storage and conversion devices.

The invention claimed is:

1. A method of manufacturing nanowires or nanofibers, comprising:
    synthesizing metal-organic nanowires or nanofibers comprising polymer chains with around 100 or more repeat units; and
    exposing the metal-organic nanowires or nanofibers to a reactive gas at a temperature in excess of around 100° C. and at a pressure in the range from around 0.001 to around 100 atmospheres.

2. The method of claim 1, wherein one or more of the polymer chains within the metal-organic nanowires or nanofibers are linked to a group of nearest neighbor polymer chains with intermolecular bonds.

3. The method of claim 2, wherein the intermolecular bonds comprise coordination bonds, donor-acceptor bonds, hydrogen bonds, van-der-Waals bonds, or a combination thereof.

4. The method of claim 1, wherein an average aspect ratio of the metal-organic nanowires or nanofibers exceeds about 100.

5. The method of claim 1, wherein the metal-organic nanowires or nanofibers comprise metal alkoxide nanowires or nanofibers.

6. The method of claim 5, wherein the metal alkoxide nanowires or nanofibers comprise metal ethoxide, metal isopropoxide or metal n-propoxide nanowires or nanofibers or their derivatives.

7. The method of claim 1, wherein the synthesizing comprises:
    immersing a bimetallic alloy in at least one solvent.

8. The method of claim 7, wherein the immersing includes:
    a first stage whereby the bimetallic alloy is immersed in a first solvent at a first temperature to produce a set of metal-organic nanowire bundles, and
    a second stage whereby the set of metal-organic nanowire bundles is immersed in or exposed to a second solvent at a second temperature to separate individual metal-organic nanowires from the set of metal-organic nanowire bundles.

9. The method of claim 8, wherein the second temperature is equal to or higher than the first temperature.

10. The method of claim 7, wherein the bimetallic alloy is in the form of a ground powder with an average volume of individual particles or pellets below around 1 $cm^3$.

11. The method of claim 7, wherein the bimetallic alloy is an Al—Li or Mg—Li alloy with a content of Li in the range from around 4 wt. % to around 50 wt. %.

12. The method of claim 1, wherein the metal-organic nanowires or nanofibers comprise one or more of aluminum (Al), magnesium (Mg) and lithium (Li) metals.

13. The method of claim 1, wherein the metal-organic nanowires or nanofibers are oxide, nitride, oxynitride, fluoride or oxyfluoride nanowires or nanofibers.

14. The method of claim 13, wherein the oxide, nitride, oxynitride, fluoride or oxyfluoride nanowires or nanofibers are amorphous or nanocrystalline with an average grain size below about 100 nm.

15. The method of claim 1, wherein the reactive gas comprises oxygen (O) molecules.

16. The method of claim 15,
    wherein the reactive gas comprises air, and
    where the exposure to the reactive gas takes place at an ambient pressure.

17. A membrane or composite composition, comprising:
    the metal-organic nanowires or nanofibers produced by the method of claim 1.

18. A Li-ion battery composition, comprising:
    the membrane or composite composition produced by the method of claim 17.

* * * * *